United States Patent
Kawabata et al.

(10) Patent No.: US 9,432,526 B2
(45) Date of Patent: *Aug. 30, 2016

(54) IMAGE FORMING SYSTEM, IMAGE FORMING APPARATUS, REMOTE CONTROL APPARATUS, AND RECORDING MEDIUM FOR DISPLAYING AN INPUT SCREEN

(71) Applicant: KONICA MINOLTA, INC., Chiyoda-ku (JP)

(72) Inventors: Mie Kawabata, Toyokawa (JP); Mitsutaka Morita, Hachioji (JP); Ryosuke Nishimura, Toyokawa (JP); Yoichi Kurumasa, Toyokawa (JP); Yoshiyuki Tamai, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,343

(22) Filed: Jun. 9, 2014

(65) Prior Publication Data

US 2014/0376042 A1 Dec. 25, 2014

(30) Foreign Application Priority Data

Jun. 21, 2013 (JP) .................................. 2013-130764

(51) Int. Cl.
*H04N 1/00* (2006.01)

(52) U.S. Cl.
CPC .... *H04N 1/00217* (2013.01); *H04N 2201/0075* (2013.01); *H04N 2201/0094* (2013.01)

(58) Field of Classification Search
CPC .......... H04N 1/00392; H04N 1/00408; H04N 1/00217

USPC ......... 358/1.15, 1.18; 382/186, 187; 345/171, 345/467; 704/8; 715/264

See application file for complete search history.

(56) References Cited

U.S. PATENT DOCUMENTS

| | | | | |
|---|---|---|---|---|
| 2009/0146860 | A1* | 6/2009 | Kwon | G08C 17/02 341/176 |
| 2009/0265669 | A1* | 10/2009 | Kida et al. | 715/863 |
| 2013/0035143 | A1* | 2/2013 | Izutsu | G06F 1/1632 455/566 |

(Continued)

FOREIGN PATENT DOCUMENTS

| | | |
|---|---|---|
| JP | H05-122424 A | 5/1993 |
| JP | 2003-067673 A | 3/2003 |

*Primary Examiner* — Jacky X Zheng
(74) *Attorney, Agent, or Firm* — Buchanan Ingersoll & Rooney PC

(57) ABSTRACT

A remote control apparatus includes a display unit that displays an operation screen for remote control of an image forming apparatus, a communication unit that, when operation input is a display instruction to display a character input screen, receives character type information indicating a type of characters to be input in the character input screen from the image forming apparatus, and a display control unit that, when the character type information is received, activates a handwriting input application installed in the remote control apparatus and displays a handwriting input screen for the handwriting input application on the display unit, on condition that the character type information indicates a first character type. When the character type information indicates a second character type different from the first character type, the display control unit displays a character input screen for input of the second character type without activating the handwriting input application.

31 Claims, 19 Drawing Sheets

(56) References Cited

U.S. PATENT DOCUMENTS

2013/0124187 A1* 5/2013 Qin ................................. 704/8

2014/0368871 A1* 12/2014 Kurumasa .......... H04N 1/00973
358/1.15

* cited by examiner

IMAGE FORMING SYSTEM, IMAGE FORMING APPARATUS, REMOTE CONTROL APPARATUS, AND RECORDING MEDIUM FOR DISPLAYING AN INPUT SCREEN

This application is based on Japanese Patent Application No. 2013-130764 filed on Jun. 21, 2013, the contents of which are hereby incorporated by reference.

BACKGROUND OF THE INVENTION

1. Technical Field

The present invention relates to an image forming system including an image forming apparatus such as a Multi-Functional Peripheral (MFP) and a technique related thereto.

2. Background Art

A technique for operating an image forming apparatus using an external terminal (remote control apparatus) is known.

For instance, Japanese Patent Application Laid-Open No. 05-122424 discloses a technique for directly transmitting data regarding an operation screen itself (e.g., bitmapped image data) from an image forming apparatus to an external terminal to display the operation screen on a display unit of the external terminal and transmitting and receiving information regarding an operational position in the operation screen (e.g., information regarding a pressed position) to receive operation input through the operation screen. This is a so-called remote control technique using remote connection.

There is also a technique that enables handwriting input, using an Input Method Editor (IME) (hereinafter also referred to as a "handwriting input IME") for inputting characters by hand (see Japanese Patent Application Laid-Open No. 2003-67673). According to this technique, the handwriting input IME (also referred to as a "handwriting input application") installed in a mobile terminal is activated so that a handwriting input screen, which is an input screen for the handwriting input IME, is displayed on a panel. A user is capable of inputting characters by hand through the handwriting input screen.

Incidentally, with the above-described technique for remotely controlling an image forming apparatus, a keyboard screen including a software keyboard may be used to input characters. Specifically, data of such keyboard screen itself (e.g., bitmapped image data) is transmitted from an image forming apparatus to an external terminal, and the keyboard screen is displayed on a display unit of the external terminal. Then, information regarding an operational position in the keyboard screen (e.g., information regarding a pressed position) is transmitted from the external terminal to the image forming apparatus so that the input of characters is received through the operation screen.

However, there are users who are not familiar with keyboard screen operations, and thus operability offered by the above technique is not necessarily sufficient.

In view of this, it is conceivable to apply a handwriting input application to the remote control technique. Use of a handwritten character recognition technique enables the user to input characters, using a handwriting input method. The user can thus input characters without using a keyboard.

However, the application of use of such a handwriting input application to all screens may rather reduce the convenience for the user. For example, in the case of inputting a four-digit numeric personal identification number, it is more convenient for the user to use a numeric keypad and press four buttons (corresponding to the four-digit number), rather than to use the handwriting input application to input four numbers (corresponding to the four-digit number) by hand.

SUMMARY OF THE INVENTION

One of objects of the present invention is to provide a technique that allows a remote control apparatus to appropriately use a plurality of different character input methods.

According to a first aspect of the present invention, a remote control apparatus for remotely controlling an image forming apparatus includes a display unit configured to display an operation screen for remotely controlling the image forming apparatus, a communication unit configured to receive character type information from the image forming apparatus when operation input from an operator to the operation screen is a display instruction to display a character input screen, the character type information being information that indicates a type of characters to be input in the character input screen, and a display control unit configured to, when the character type information is received from the image forming apparatus, activate a handwriting input application installed in the remote control apparatus and display a handwriting input screen on the display unit on condition that the character type information indicates a first character type, the handwriting input screen being an input screen for the handwriting input application. The display control unit is configured to, when the character type information indicates a second character type different from the first character type, display a character input screen for input of the second character type on the display unit without activating the handwriting input application.

According to a second aspect of the present invention, an image forming system includes an image forming apparatus, and a remote control apparatus for remotely controlling the image forming apparatus. The image forming apparatus includes a reception unit configured to receive operation input information from the remote control apparatus, the operation input information being information regarding operation input from an operator to an operation screen displayed on the remote control apparatus, and a transmission unit configured to, when it is determined on the basis of the operation input information that the operation input is a display instruction to display a character input screen, transmit character type information to the remote control apparatus, the character type information being information that indicates a type of characters to be input in the operation input screen. The remote control apparatus includes a display unit configured to display an operation screen for remotely controlling the image forming apparatus, a communication unit configured to receive character type information from the image forming apparatus when operation input from an operator to the operation screen is a display instruction to display a character input screen, the character type information being information that indicates a type of characters to be input in the character input screen, and a display control unit configured to, when the character type information is received from the image forming apparatus, activate a handwriting input application installed in the remote control apparatus and display a handwriting input screen on the display unit on condition that the character type information indicates a first character type, the handwriting input screen being an input screen for the handwriting input application. The display control unit is configured to, when the character type information indicates a second character type different from the first character type, display a character input screen for input of the second character type on the display unit without activating the handwriting input application.

According to a third aspect of the present invention, a non-transitory computer-readable recording medium records a program for causing a computer built into a remote control apparatus for remotely controlling an image forming apparatus to execute the steps of a) displaying an operation screen for remotely controlling the image forming apparatus on a display unit of the remote control apparatus, b) when operation input from an operator to the operation screen is a display instruction to display a character input screen, receiving character type information from the image forming apparatus, the character type information being information that indicates a type of characters to be input in the character input screen, c) when the character type information is received from the image forming apparatus and indicates a first character type, activating a handwriting input application installed in the remote control apparatus and displaying a handwriting input screen on the display unit, the handwriting input screen being an input screen for the handwriting input application, and d) when the character type information is received from the image forming apparatus and indicates a second character type different from the first character type, displaying a character input screen for input of the second character type on the display unit without activating the handwriting input application.

According to a fourth aspect of the present invention, an image forming apparatus capable of remotely controlling a remote control apparatus includes a reception unit configured to receive operation input information from the remote control apparatus, the operation input information being information regarding operation input from an operator to an operation screen displayed in the remote control apparatus, an acquisition unit configured to determine, on the basis of the operation input information, whether or not the operation input is a display instruction to display a character input screen and to acquire character type information that indicates a type of characters to be input in the character input screen, and a transmission unit configured to, when it is determined that the operation input is a display instruction to display the character input screen, transmit an activation command to activate a handwriting input application installed in the remote control apparatus to the remote control apparatus, on condition that the character type information indicates a first character type. The transmission unit is configured to not transmit the activation command when the character type information indicates a second character type different from the first character type.

According to a fifth aspect of the present invention, an image forming system includes an image forming apparatus, and a remote control apparatus for remotely controlling the image forming apparatus. The image forming apparatus includes a reception unit configured to receive operation input information from the remote control apparatus, the operation input information being information regarding operation input from an operator to an operation screen displayed in the remote control apparatus, an acquisition unit configured to determine, on the basis of the operation input information, whether or not the operation input is a display instruction to display a character input screen and to acquire character type information that indicates a type of characters to be input in the character input screen, and a transmission unit configured to, when it is determined that the operation input is a display instruction to display the character input screen, transmit an activation command to activate a handwriting input application installed in the remote control apparatus to the remote control apparatus, on condition that the character type information indicates a first character type. The transmission unit is configured to not transmit the activation command when the character type information indicates a second character type different from the first character type. The remote control apparatus includes a display unit configured to display the operation screen, a display control unit configured to, when the activation command is received from the image forming apparatus, activate the handwriting input application and display a handwriting input screen that is an input screen for the handwriting input application, on the display unit. The display control unit is configured to, when the character type information indicates a second character type different from the first character type, display a character input screen for input of characters of the second character type on the display unit without activating the handwriting input application.

According to a sixth aspect of the present invention, a non-transitory computer-readable recording medium records a program for causing a computer built into an image forming apparatus capable of being remotely controlled by a remote control apparatus to execute the steps of a) receiving operation input information from the remote control apparatus, the operation input information being information regarding operation input from an operator to an operation screen displayed on the remote control apparatus, and determining on the basis of the operation input information whether or not the operation input is a display instruction to display a character screen, b) acquiring character type information that indicates a type of characters to be input in the character input screen, and c) in a case where it is determined that the operation input is the display instruction to display a character input screen, transmitting an activation command to activate the handwriting application installed in the remote control apparatus to the remote control apparatus if the character type information indicates a first character type, and not transmitting the activation command to the remote control apparatus if the character type information is a second character type different from the first character type.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, embodiments of the present invention will be described with reference to the accompanying drawings.

1. First Embodiment 1-1. Overall Configuration

Figure 1:
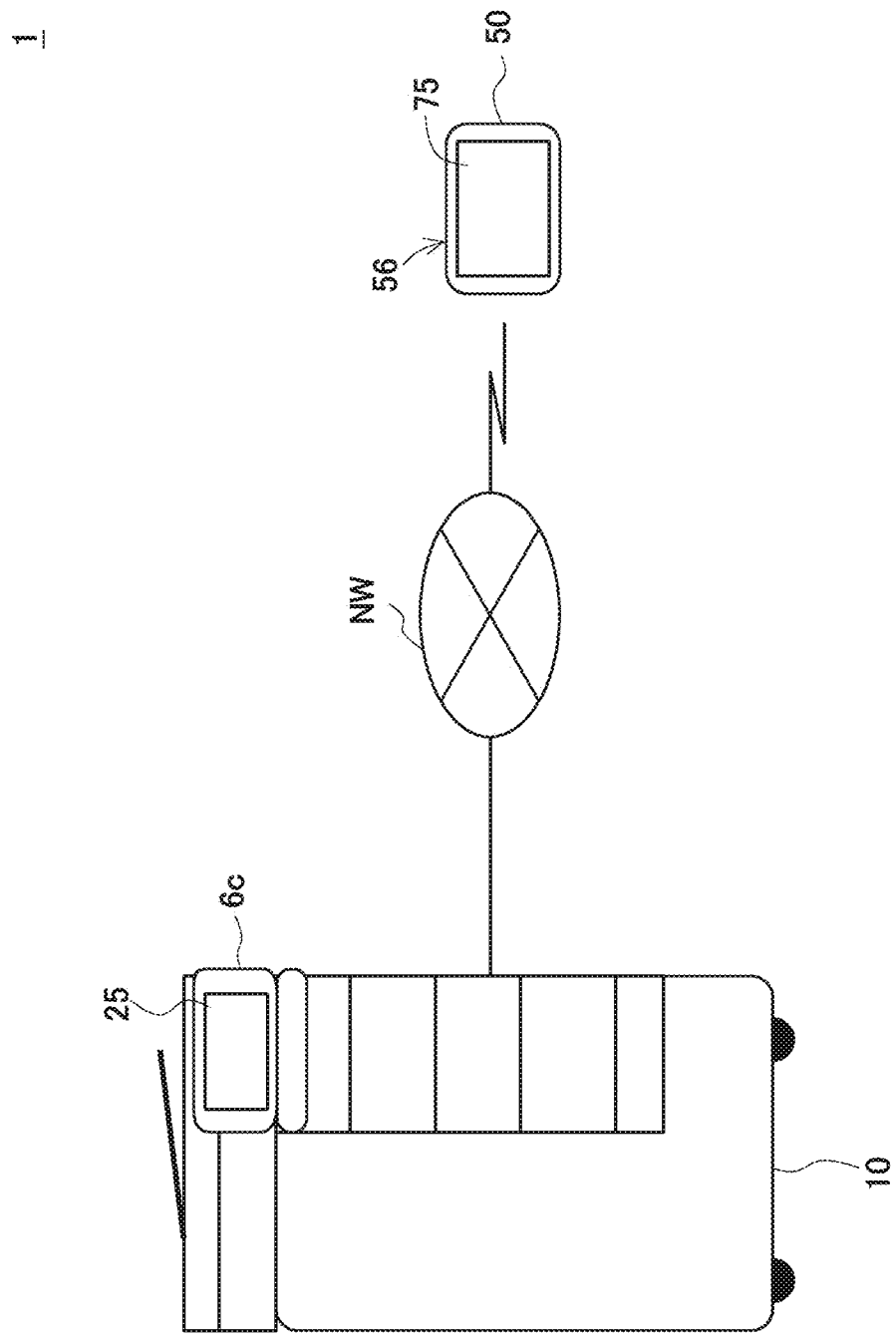
FIG. 1 illustrates an image forming system.

FIG. 1 illustrates an image forming system 1 according to a first embodiment. As illustrated in FIG. 1, the image forming system 1 includes an image forming apparatus 10 and an external terminal 50.

The image forming apparatus 10 and the external terminal 50 are connected to each other via a network NW. The network NW is, for example, a local area network (LAN) or the Internet. The connection to the network NW may be either wired or wireless connection. For example, the image forming apparatus 10 is wire-connected to the network NW, and the external terminal 50 is wirelessly connected to the network NW.

In the image forming system 1, it is possible to perform various types of operations on the image forming apparatus 10, using the external terminal 50. In other words, the external terminal 50 is capable of remotely controlling the image forming apparatus 10. The image forming system 1 is also referred to as a "remote control system" for remotely controlling the image forming apparatus 10.

1-2. Configuration of Image Forming Apparatus

Figure 2:
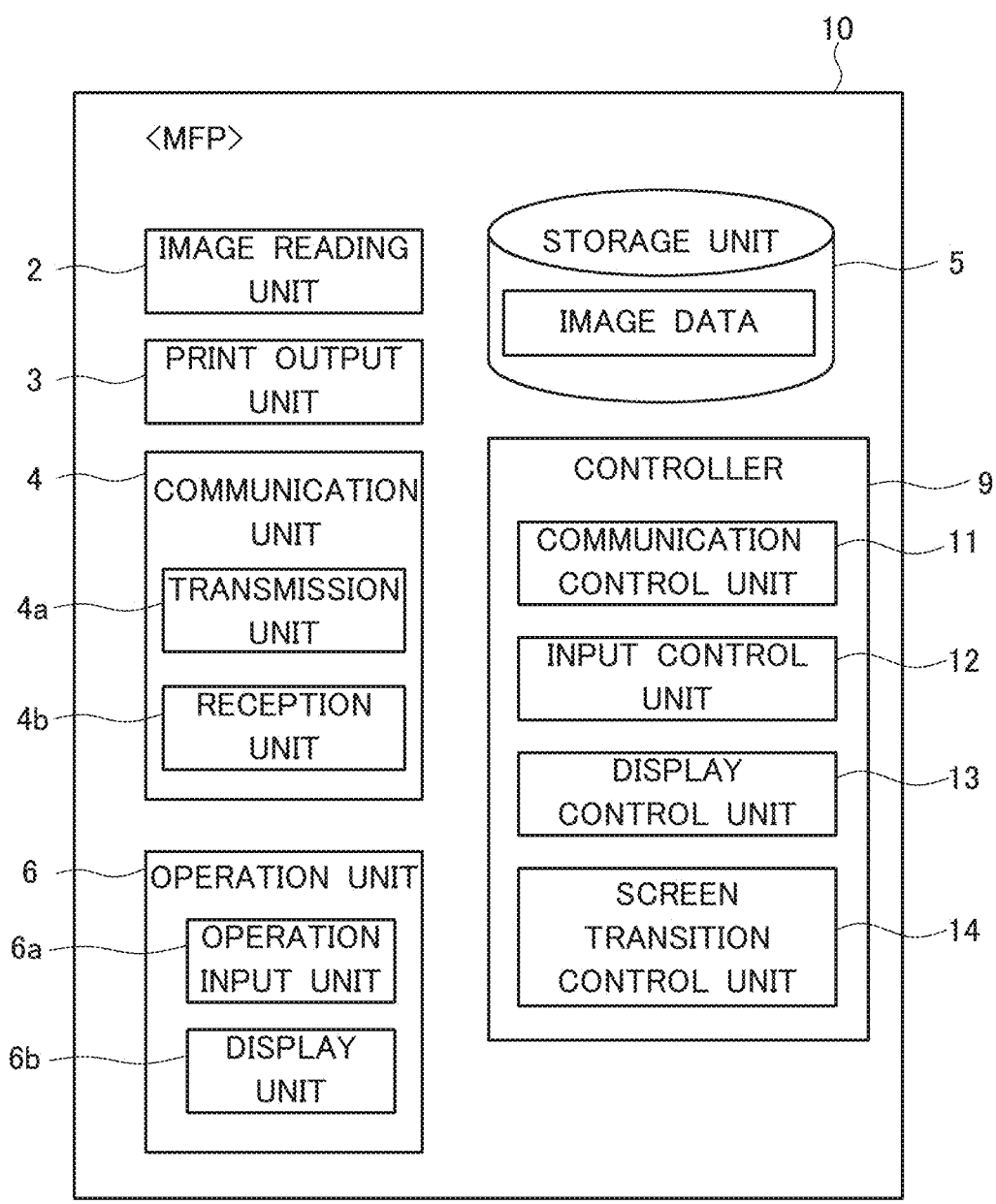
FIG. 2 is a functional block diagram of an image forming apparatus.

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as illustrated in the functional block diagram of FIG. 2 and realizes various types of functions by operating these units in combination.

The image reading unit 2 is a processing unit configured to optically read (i.e., scan) an original document that is placed at a predetermined position on the MFP 10 and generate image data of the original document (also referred to as an "original image" or a "scanned image"). This image reading unit 2 is also referred to as a "scanning unit".

The print output unit 3 is an output unit configured to print out an image on various types of media such as paper on the basis of data regarding an object to be printed.

The communication unit 4 is a processing unit capable of facsimile communication via a public network or the like. The communication unit 4 is also capable of network communication via the network NW. In the network communication, various types of protocols such as TCP/IP (Transmission Control Protocol/Internet Protocol) are used. Using the network communication allows the MFP 10 to exchange various types of data with the desired destination (e.g., the external terminal 50). The communication unit 4 includes a transmission unit 4a configured to transmit various types of data and a reception unit 4b configured to receive various types of data.

The storage unit 5 is constituted by a storage device such as a hard disk drive (HDD). The storage unit 5 stores image data of each operation screen, for example.

The operation unit 6 includes an operation input unit 6a configured to receive input of operation (hereinafter, operation input) to the MFP 10, and a display unit 6b configured to display and output various types of information.

The MFP 10 is also provided with a generally plate-like operation panel unit 6c (see FIG. 1). The operation panel unit 6c includes a touch panel 25 (see FIG. 1) on the front side. The touch panel 25 functions as part of the operation input unit 6a and also functions as part of the display unit 6b. The touch panel 25 is configured by embedding various sensors or the like in a liquid crystal display panel and is capable of displaying various types of information and receiving various types of operation input from an operator.

The touch panel 25 displays, for example, a menu image (including button images and so on). An operator can set the details of various operations of the image forming apparatus 10 by pressing buttons (buttons represented by button images) that are virtually arranged in the touch panel 25.

Note that, as will be described later, a touch panel 75 (see FIG. 1) of the external terminal 50 displays a screen similar to the operation screen displayed on the touch panel 25 of the image forming apparatus 10. Using an operation screen MS (also referred to as SE) displayed on the touch panel 75 of the external terminal 50 realizes an operation similar to that performed through an operation screen MS (also referred to as SP) displayed on the touch panel 25 of the image forming apparatus 10.

The controller 9 is a control device that is built into the MFP 10 and performs overall control of the MFP 10. The controller 9 is configured as a computer system including, for example, a CPU and various types of semiconductor memories (RAM and ROM). The controller 9 realizes various types of processing units by the CPU executing a predetermined software program (hereinafter also referred to simply as a "program") PG1 stored in the ROM (e.g., EEPROM). Note that the program (specifically, a group of program modules) PG1 may be installed in the MFP 10 via a portable recording medium (or in other words, a non-transitory computer-readable recording medium) such as a USB memory or via the network NW or the like.

Specifically, as illustrated in FIG. 2, the controller 9 realizes various types of processing units including a communication control unit 11, an input control unit 12, a display control unit 13, and a screen transition control unit 14 by executing the program PG1.

The communication control unit 11 is a processing unit configured to control an operation of communication with another device (e.g., the external terminal 50). For example, the communication control unit 11 transmits, to the external terminal 50, an image (specifically, data of the image) for displaying the operation screen (also referred to as a "remote control screen") MS (SE) (see FIG. 4) on the external terminal 50, in cooperation with the communication unit 4 or the like.

The input control unit 12 is a control unit configured to control an operation of input operation to the operation input unit 6a (e.g., the touch panel 25). For example, the input control unit 12 controls operations for receiving operation input to the operation screen MS (SP) (not shown) displayed on the touch panel 25.

The display control unit 13 is a processing unit configured to control a display operation of the display unit 6b (e.g., the touch panel 25). The display control unit 13 causes, for example, the operation screen MS (SP) for operating the image forming apparatus 10 to be displayed on the touch panel 25.

The screen transition control unit 14 is a control unit configured to control screen transition of the operation screen. The screen transition control unit 14 controls not only the screen transition of the operation screen MS (SP) of the touch panel 25, but also the screen transition of the operation screen MS (SE) of the touch panel 75. For example, the screen transition control unit 14 determines the content of operation input to the external terminal 50 on the basis of operational position information (coordinate values representing a position at which the operation input was made, etc.) transmitted from the external terminal 50, and determines, for example, a transition destination screen on the basis of the content of the operation input.

1-3. Configuration of External Terminal

Next is a description of a configuration of the external terminal (also referred to as the "remote control apparatus") 50.

The external terminal 50 is a portable information input/output terminal device capable of network communication with other devices. Here, a tablet terminal is illustrated as an example of the external terminal 50. The present invention is, however, not limited to this, and the external terminal 50 may, for example, be a smartphone or a personal computer. The external terminal 50 may also be either a portable or a stationary apparatus.

Figure 3:
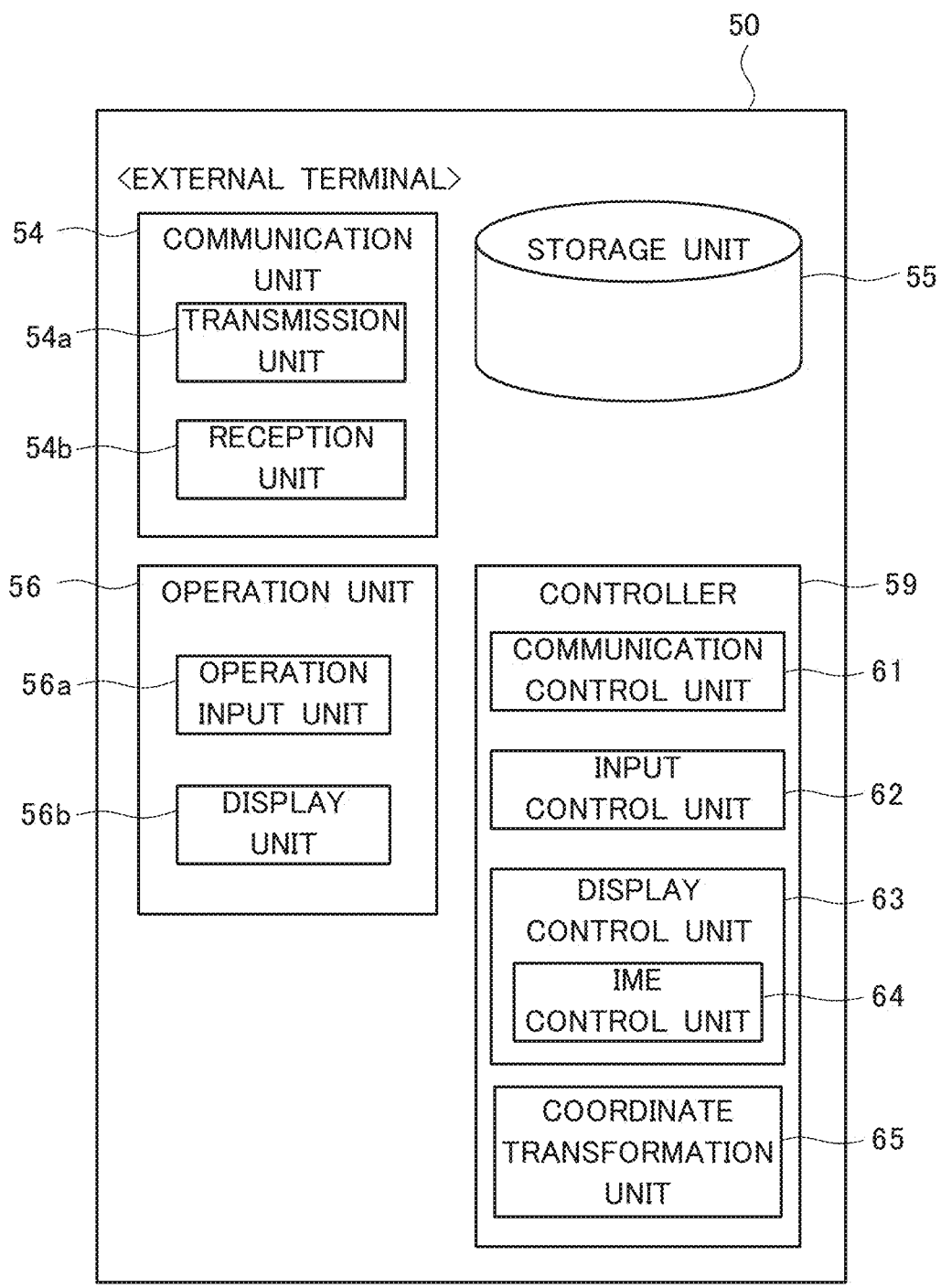
FIG. 3 is a functional block diagram illustrating an overall configuration of an external terminal (remote control apparatus).

FIG. 3 is a functional block diagram illustrating an overall configuration of the external terminal 50.

As illustrated in the functional block diagram of FIG. 3, the external terminal 50 includes, for example, a communication unit 54, a storage unit 55, an operation unit 56, and a controller 59 and realizes various types of functions by operating these units in combination.

The communication unit 54 is capable of network communication via the network NW. In the network communication, various types of protocols such as TCP/IP (Transmission Control Protocol/Internet Protocol) are used. Using the network communication allows the external terminal 50 to exchange various types of data with the desired destination (e.g., the image forming apparatus 10). The communication unit 54 includes a transmission unit 54a configured to transmit various types of data and a reception unit 54b configured to receive various types of data. For example, the reception unit 54b receives an image (specifically, data of the image) for displaying the operation screen (operation screen for remote control) MS (SE) from the MFP 10, and the transmission unit 54a transmits information regarding operation input to the operation screen MS displayed on the touch panel 75 (e.g., information regarding coordinates touched by the operator) to the MFP 10.

The storage unit 55 is configured by a storage device such as a nonvolatile semiconductor memory. The storage unit 55 temporarily stores various types of image data transmitted from the MFP 10. For example, image data of an image for displaying the operation screen MS or the like is temporarily stored.

The operation unit 56 includes an operation input unit 56a configured to receive operation input to the external terminal 50, and a display unit 56b configured to display and output various types of information. The external terminal 50 is also provided with the touch panel 75 (see FIG. 1) configured by embedding various sensors and the like in a liquid crystal display panel. Specifically, as illustrated in FIG. 1, the touch panel 75 is provided so as to cover almost the entire surface of the generally plate-like external terminal 50 on the front side excluding the periphery (frame portion). The touch panel 75 functions as part of the operation input unit 56a and also functions as part of the display unit 56b.

The touch panel 75 displays an operation screen similar to that displayed on the touch panel 25 as a remote control screen MS (a screen for remotely controlling the MFP 10). The touch panel 75 also receives a touch gesture operation (also referred to as a "touch operation") made on the remote control screen MS or the like.

The controller 59 shown in FIG. 3 is a control device that is built into the external terminal 50 and performs overall control of the external terminal 50. The controller 59 is configured as a computer system that includes, for example, a CPU and various types of semiconductor memories (RAM and ROM). The controller 59 realizes various types of processing units by the CPU executing a predetermined software program (simply "program") stored in a storage unit (e.g., a semiconductor memory). The program may be installed in the external terminal 50 via a portable recording medium (or in other words, a non-transitory computer-readable recording medium) such as a USB memory or via the network NW or the like.

As one of application software programs, the external terminal 50 has installed therein an Input Method Editor (IME) (hereinafter also referred to as a "handwriting input IME") for handwriting input for characters. The handwriting input IME performs, for example, processing for receiving operation input of a handwritten character from an operating user and recognizing the input handwritten character.

The external terminal 50 has also installed therein a remote control program PG2. The program PG2 is an application software program for remotely controlling the image forming apparatus 10 and realizes various functions for remote control.

Specifically, the controller 59 realizes various types of processing units including a communication control unit 61, an input control unit 62, a display control unit 63, and a coordinate transformation unit 65 by executing the program PG2.

Figure 5:
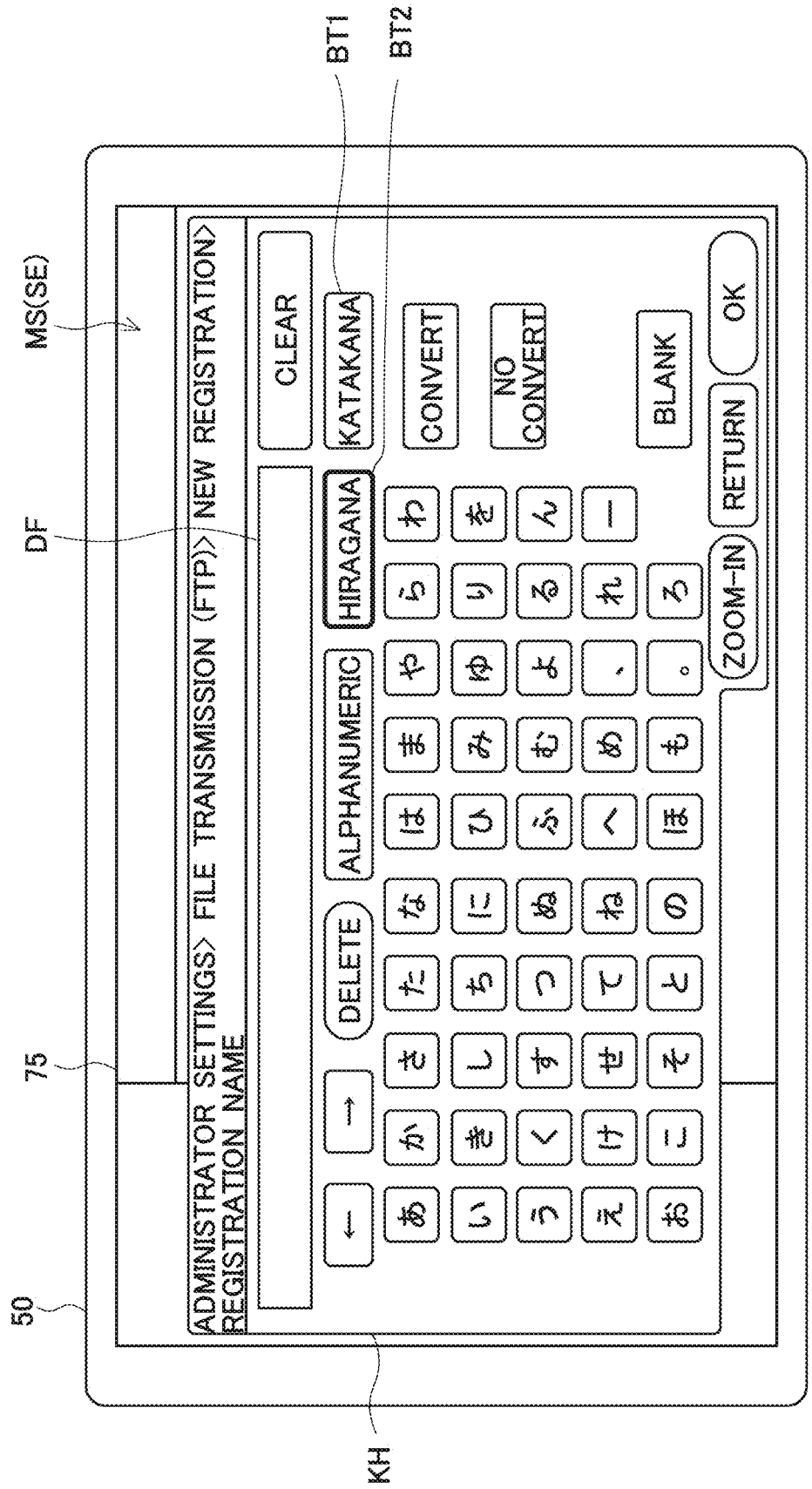
FIG. 5 illustrates a hiragana keyboard screen.
Figure 6:
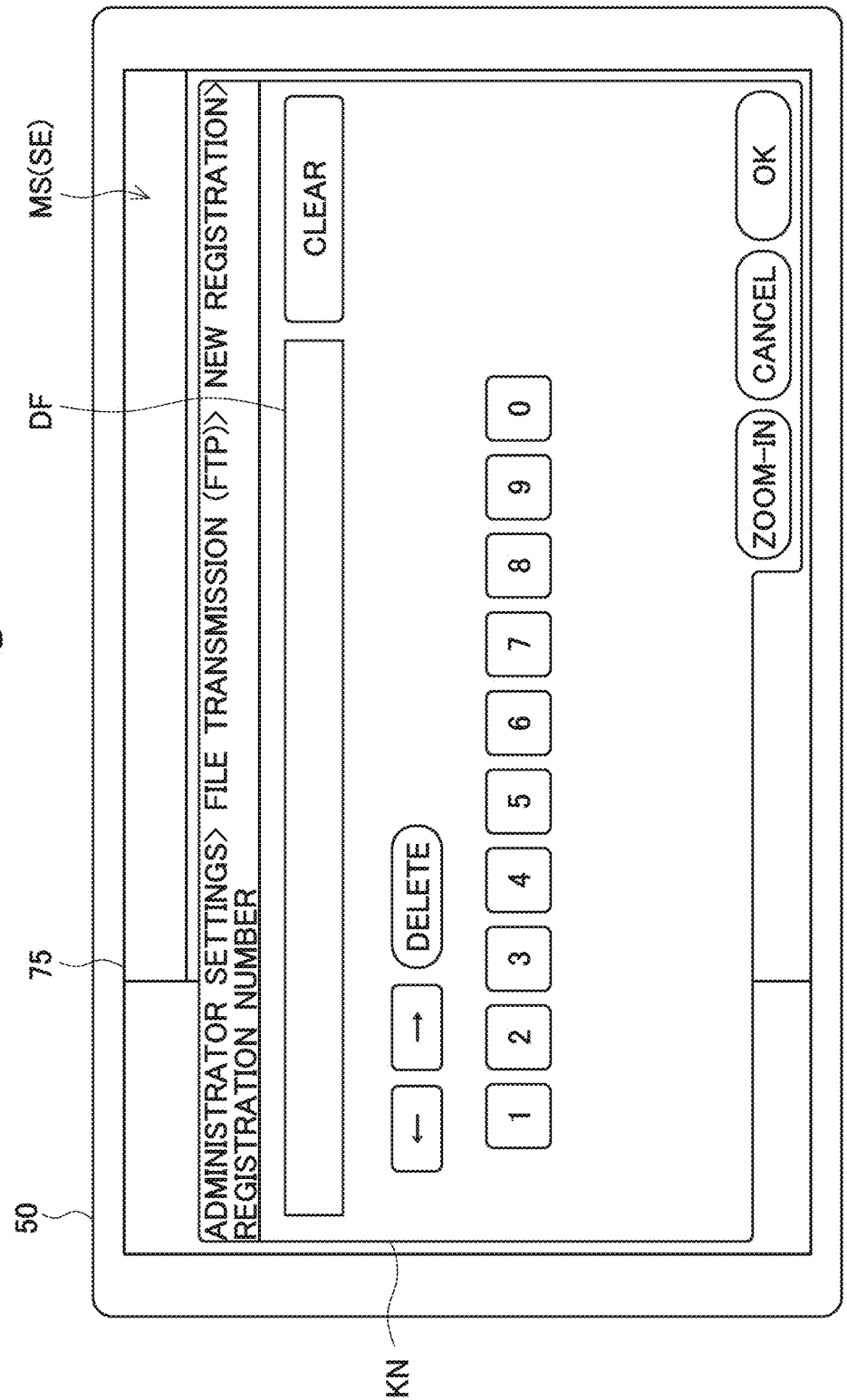
FIG. 6 illustrates a numeric keyboard screen.

The communication control unit 61 is a processing unit configured to control an operation of communication with the image forming apparatus 10 or the like in cooperation with, for example, the communication unit 54. For example, the communication control unit 61 receives an image for displaying the operation screen MS (including keyboard screens KH and KN, for example) (see FIGS. 4 to 6) on the external terminal 50 in cooperation with, for example, the communication unit 54.

The input control unit 62 is a control unit configured to control an operation of operation input to the operation input unit 56a (e.g., the touch panel 75). For example, the input control unit 62 controls an operation of receiving touch operation input to, for example, the operation screen MS (including keyboard screens KH and KN, for example). The input control unit 62 also controls an operation of receiving touch operation input to a handwriting input screen HS (see FIG. 7).

The coordinate transformation unit 65 is a processing unit configured to convert coordinate values representing the position at which operation input was made on the touch panel 75 from values in the coordinate system of the touch panel 75 of the external terminal 50 to values in the coordinate system of the touch panel 25 of the image forming apparatus 10. Note that the coordinate values obtained by the conversion are transmitted to the image forming apparatus 10 by the communication control unit 61 or the like as position information (operational position information) MP indicating the position at which the operation input was made.

The display control unit 63 is a processing unit configured to control a display operation of the display unit 56b (e.g., the touch panel 75). The display control unit 63 causes, for example, the operation screen MS (SE) for remotely controlling the image forming apparatus 10 to be displayed on the touch panel 75.

The display control unit 63 includes an IME control unit 64. The IME control unit 64 is configured to control an operation of the handwriting input IME installed in the external terminal 50. The IME control unit 64 controls, for example, whether or not to display the handwriting input screen HS on the touch panel 75. Specifically, the IME control unit 64 controls, for example, a later-described operation of displaying the handwriting input screen HS together with a hiragana keyboard screen KH.

1-4. Operation Screen

In the image forming system 1, the operation screen MS (SP) (not shown) is displayed on the touch panel 25 of the image forming apparatus 10, and the operation screen MS (SE) (see FIG. 4) is displayed on the touch panel 75 of the external terminal 50. The operation screen SE displayed on the touch panel 75 is, in appearance, similar to the operation screen SP displayed on the touch panel 25.

The operation screen MS (SE) of the external terminal 50 is displayed basically on the basis of image data (also referred to as "simulated image data") of a simulated image obtained by simulating the operation screen MS (SP) of the touch panel 25 of the image forming apparatus 10. The simulated image data is configured as, for example, a bitmapped image.

Here, a setting screen regarding FTP (file transfer protocol) transmission (also referred to as a file transmission setting screen) (see FIG. 4) is illustrated as an example of the operation screen MS.

Figure 4:
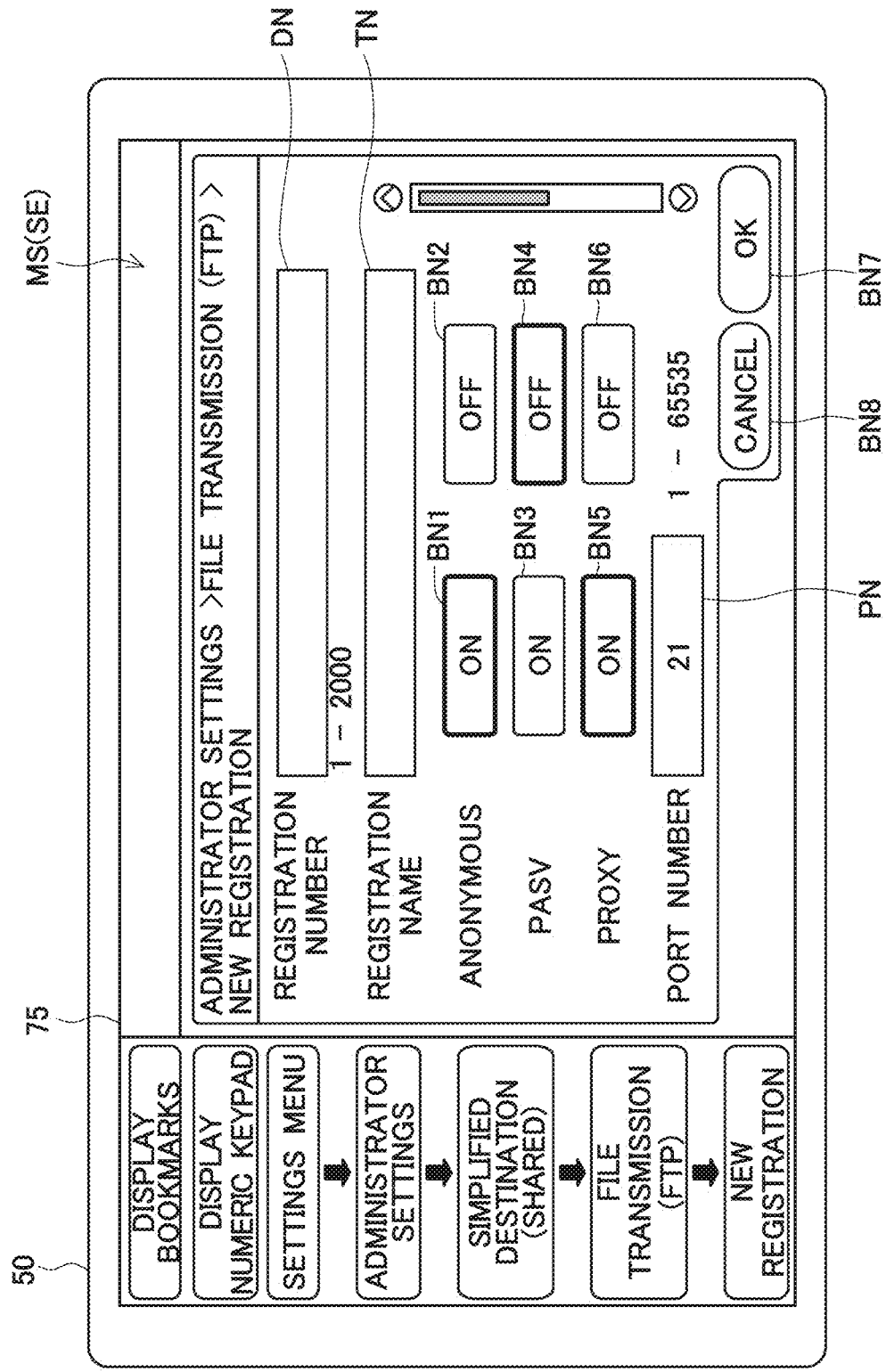
FIG. 4 illustrates an FTP transmission setting screen (operation screen).

FIG. 4 illustrates an FTP transmission setting screen (operation screen) MS (specifically, a new registration screen). The FTP transmission setting screen MS includes, for example, a registration number field DN, a registration name field TN, various types of setting buttons BN1 to BN6, and a port number field PN.

An operation (operation input) of pressing each of the various setting buttons BN1 to BN6 is determined as a selection instruction to select an option corresponding to the button. Then, the content of the option corresponding to the pressed button is set. For example, if either of the buttons BN1 and BN2 regarding "anonymous setting" is pressed, the content corresponding to the pressed option is set. To be specific, if the "ON" button BN1 is pressed, the anonymous setting is enabled, and if the "OFF" button BN2 is pressed, the anonymous setting is disabled. A similar operation is also performed for the operation of pressing the buttons BN3 and BN4 regarding "passive (PASV) mode setting" and the operation of pressing the buttons BN5 and BN6 regarding "proxy setting".

On the other hand, the following character input operation is performed in the case of inputting characters in character input fields (specifically, the registration number field DN, the registration name field TN, and the port number field PN).

First, an operation of inputting characters in the registration name field TN will be described.

When the registration name field TN itself is pressed, a software keyboard screen (to be more specific, a hiragana keyboard screen) KH (see FIG. 5) is displayed. Specifically, image data of the "hiragana" keyboard screen KH is transmitted from the image forming apparatus 10 to the external terminal 50, and the external terminal 50 displays the "hiragana" keyboard screen KH on the basis of the image data. The "hiragana" keyboard screen KH includes a plurality of character buttons (character keys) that respectively correspond to characters ("Japanese hiragana characters"). The operating user is capable of performing an operation of inputting characters (an operation of inputting the registration name), using those character buttons. In addition, a hiragana-to-kanji conversion function can be implemented to convert one or a plurality of "hiragana" characters into a kanji character(s) for input.

Figure 19:
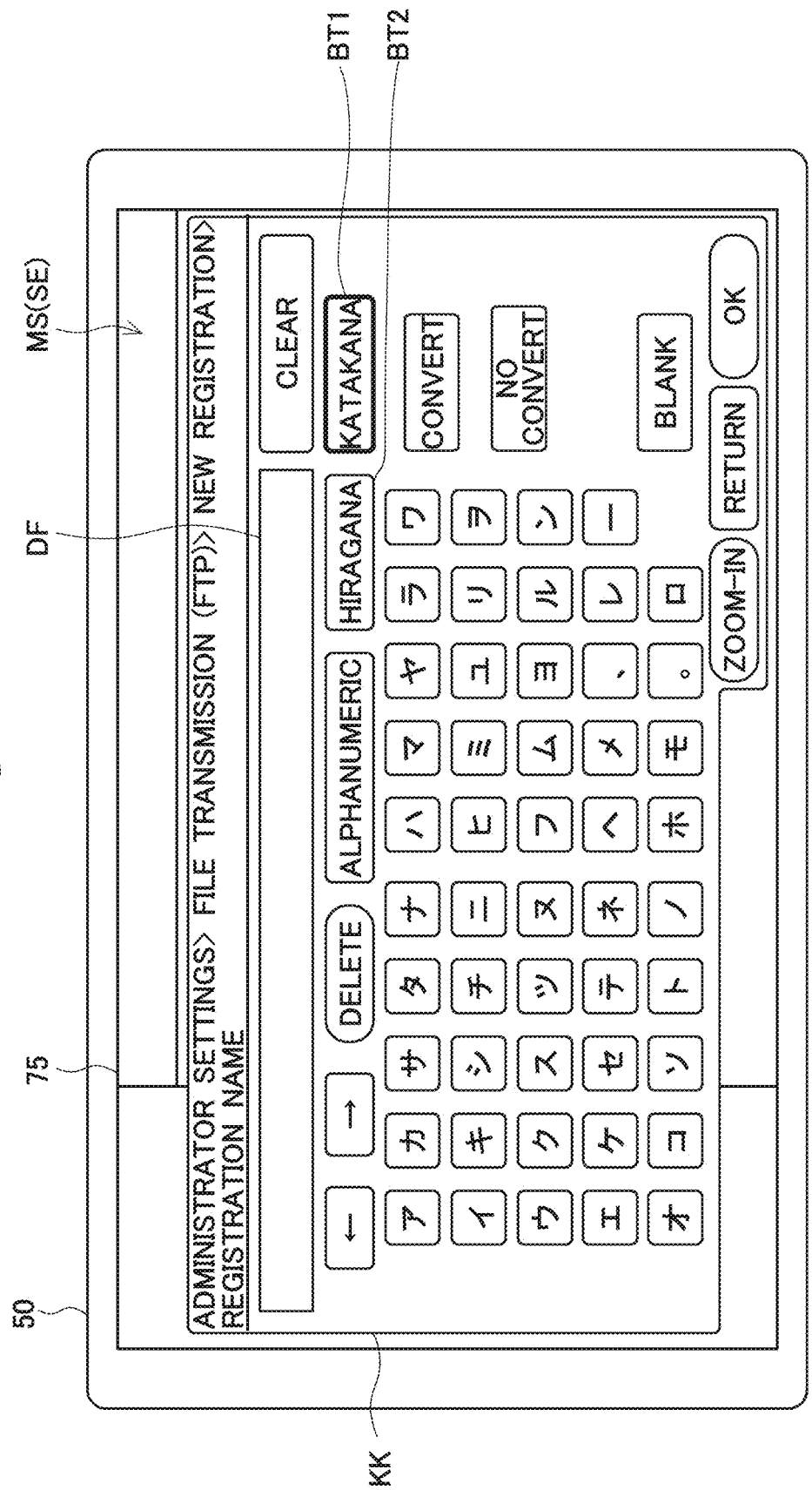
FIG. 19 illustrates a katakana keyboard screen.

If a "katakana" button BT1 (FIG. 5) in the "hiragana" keyboard screen KH is pressed, a "katakana" keyboard screen KK (see FIG. 19) is displayed, instead of the "hiragana" keyboard screen KH. Specifically, new image data for displaying the "katakana" keyboard screen is transmitted from the image forming apparatus 10 to the external terminal 50, and the external terminal 50 displays the "katakana" keyboard screen on the basis of the new image data. Hereinafter, an input operation using the "katakana" keyboard screen is performed. On the contrary, if a "hiragana" button BT2 (FIG. 19) in the "katakana" keyboard screen is pressed, the "hiragana" keyboard screen is displayed, instead of the "katakana" keyboard screen.

In the present embodiment, when the image data of the "hiragana" keyboard screen KH has been received by the external terminal 50, the handwriting input IME is activated immediately after the "hiragana" keyboard screen KH is once displayed on the basis of the image data.

Specifically, an input screen for the handwriting input IME (also referred to as a "handwriting input screen") HS (see FIG. 7) is displayed on the keyboard screen KH in a superimposed manner after a predetermined delay period Δt (e.g., 100 milliseconds (ms)) has passed from when the keyboard screen KH was displayed (display start time). In other words, immediately after the keyboard screen KH has been displayed, the handwriting input screen HS is displayed on the keyboard screen KH with a slight delay period Δt.

In this way, the keyboard screen KH and the handwriting input screen HS are displayed in combination. In this state, the keyboard screen KH is disabled, and the handwriting input screen HS is enabled.

Figure 7:
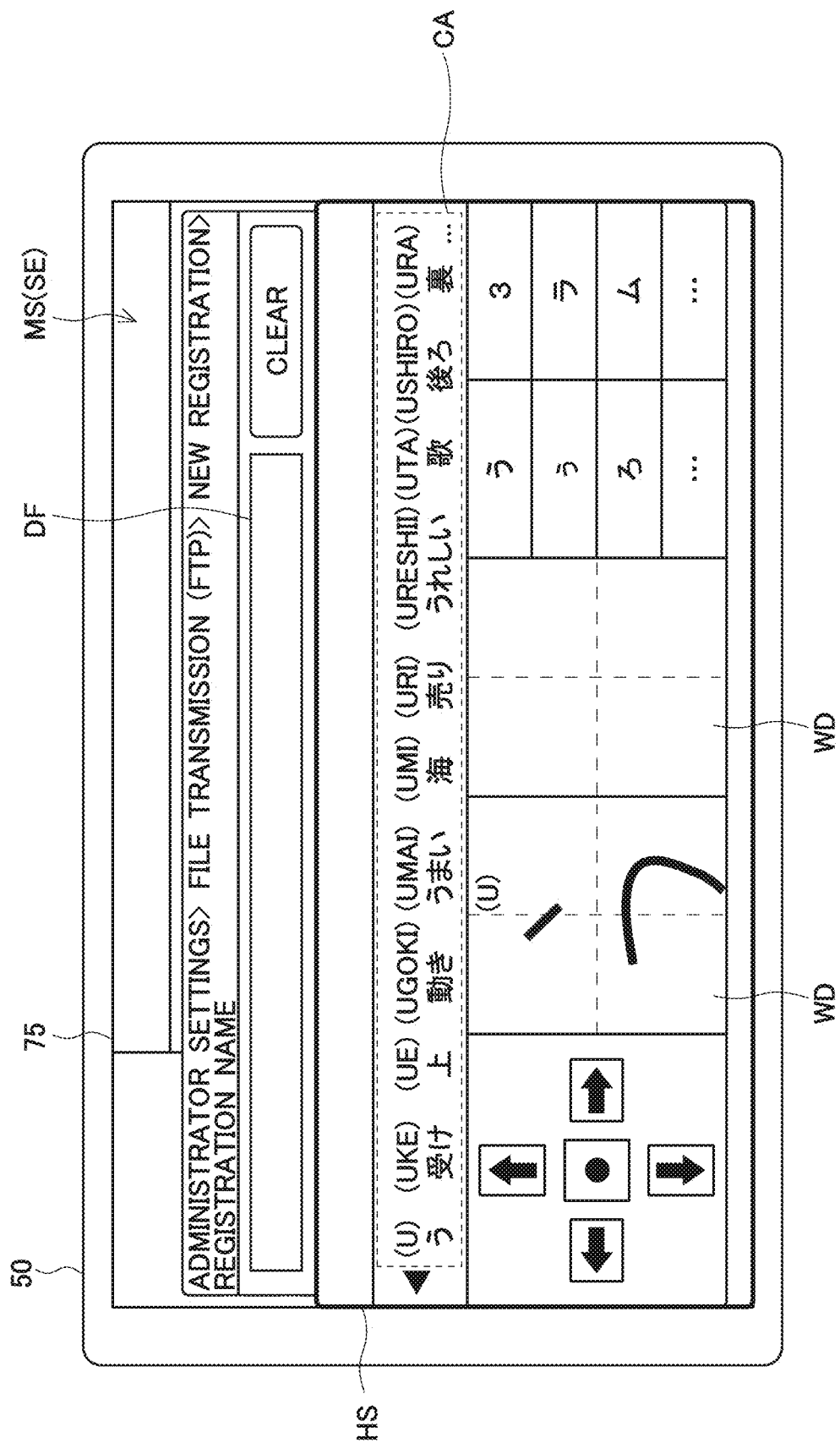
FIG. 7 illustrates a state in which a handwriting input screen is displayed on the keyboard screen in a superimposed manner.

In this display state, input of characters is performed using the handwriting input screen HS (see FIG. 7). That is, the user is capable of using the handwriting input IME pre-installed in the external terminal 50 to perform operation input to the operation screen of the image forming apparatus 10.

Specifically, when a line representing a character (e.g., hiragana letter "U") is drawn in a handwriting input area WD of the handwriting input screen HS by a finger of the operator, the handwriting input IME performs character recognition processing on the basis of the trajectory of finger movement or the like and displays conversion candidates (input candidates) based on the result of the character recognition processing in a conversion candidate field CA. When the operator has selected the desired option (e.g., a Japanese Kanji character called "UE") from the conversion candidate field CA, the selected character string is displayed in the input character display field DF. The selected character string is not only displayed in the input character display field DF, but also notified to the image forming apparatus 10. The image forming apparatus 10 thereby acquires the content of the operation input using the handwriting input IME and recognizes the same content as that displayed in the input character display field DF of the external terminal 50 as the operator's input content.

The operation of inputting characters in the registration name field TN (the operation of inputting Japanese hiragana characters, for example) is performed through the procedure described above.

Next, an operation of inputting characters in the registration number field DN (an operation of inputting numbers) will be described.

When the registration number field DN itself is pressed by the operator, a software keyboard screen (specifically, a numeric keyboard screen) KN (see FIG. 6) is displayed on the touch panel 75, as will be described later.

The "numeric" keyboard screen KN includes a plurality of character buttons (numeric keys) that respectively correspond to characters (numbers). The operating user can use these character buttons (numeric keys) to perform the operation of inputting characters (the operation of inputting the registration number).

While the handwriting input IME is activated in the case of inputting "hiragana" characters as described above, the handwriting input IME is not activated in the case of inputting "numbers".

For example, in the case of inputting the registration number, which is a 4-digit number, the user will press four buttons (corresponding to the 4-digit number), using the numeric keyboard screen KN. Such an operation is more convenient for the user, rather than inputting four numbers (corresponding the 4-digit number) by hand through the use of the handwriting input application. That is, in the case of inputting numbers, the numeric keyboard KN (FIG. 6) transmitted from the image forming apparatus 10 is used as-is. In other words, this prevents the user's convenience from being reduced due to the application of use of the handwriting input application (handwriting input IME) to all the screens.

Similarly, the numeric keyboard screen KN is also displayed for numeric input of the port number field PN.

As described above, for the numeric input of the registration number field DN and the port number field PN, the numeric keyboard screen KN is used without using the handwriting input screen HS. In other words, the use of the handwriting input application (handwriting input IME) is not applied to at least the numeric keyboard screen KN among all the character input screens. This properly ensures the convenience for the user.

Figure 11:
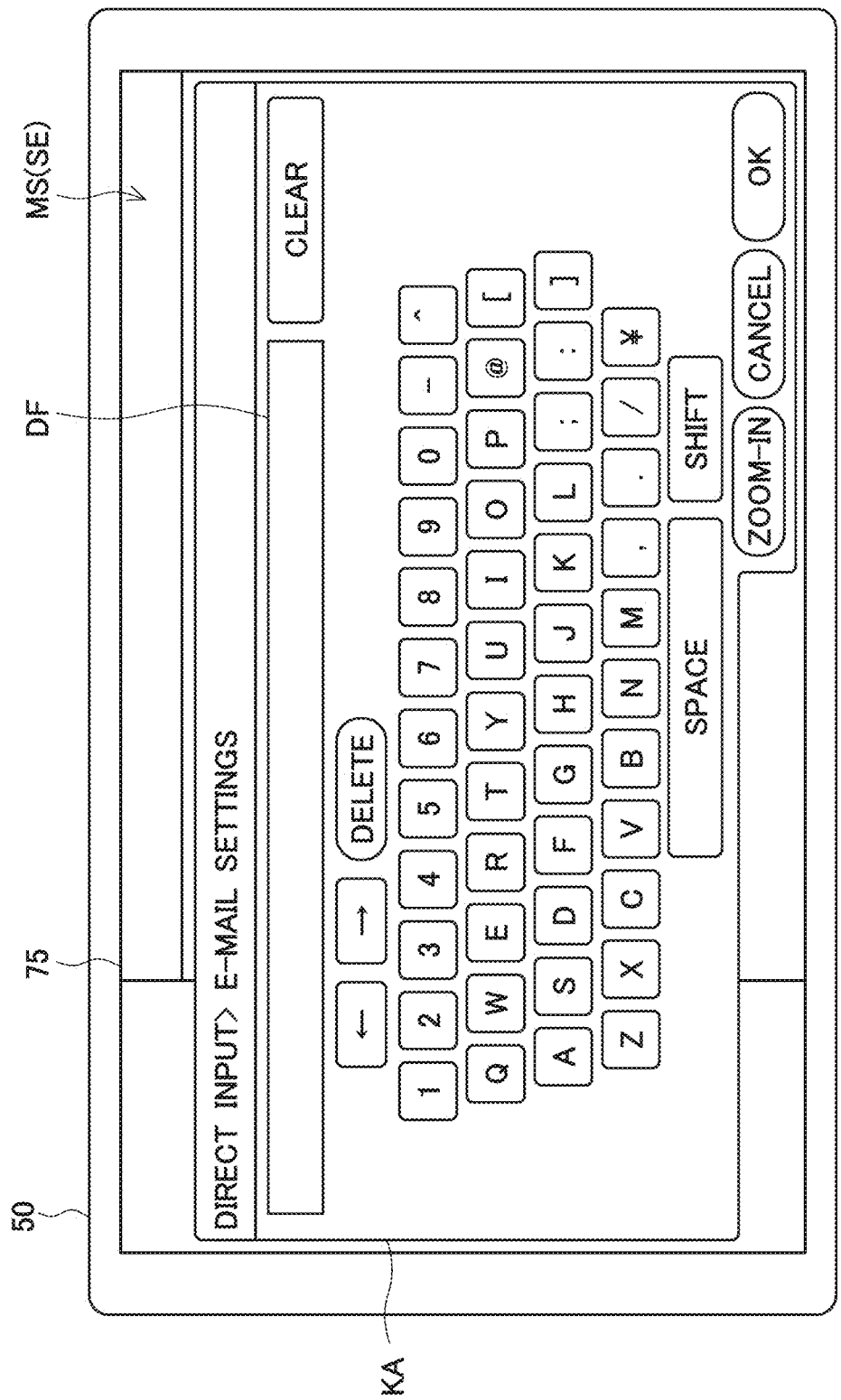
FIG. 11 illustrates an alphabetical keyboard screen.
Figure 12:
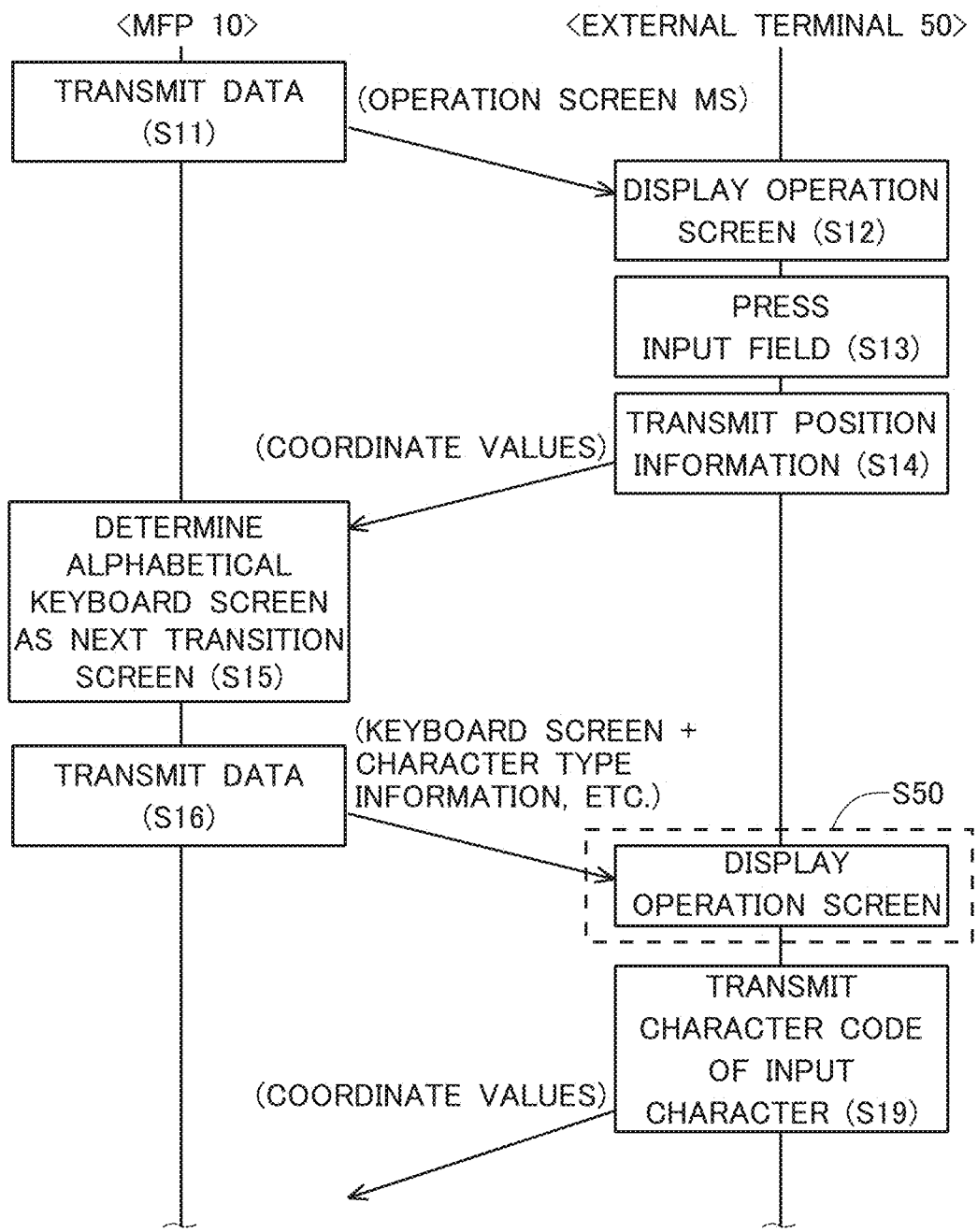
FIG. 12 illustrates operations performed by the image forming apparatus and the external terminal in the case of inputting a letter of the alphabet.

Note that the aforementioned operation (see FIG. 8) performed at the time of inputting "hiragana" characters is also performed at the time of inputting "katakana" characters. Also, the aforementioned operation (see FIG. 9) performed at the time of inputting numbers is also performed at the time of inputting the "alphabet" (see FIG. 12). For example, in the case of inputting an e-mail address, a keyboard screen KA (see FIG. 11) for inputting the "alphabet" is displayed without activating the handwriting input IME, and an input operation is performed using the keyboard screen KA for input of the "alphabet". The keyboard screen KA for input of the alphabet shown in FIG. 11 is a keyboard screen through which not only the "alphabet" but also "numbers" can be input, and it is a so-called keyboard screen for "alphanumeric" input.

1-5. Operations

Figure 8:
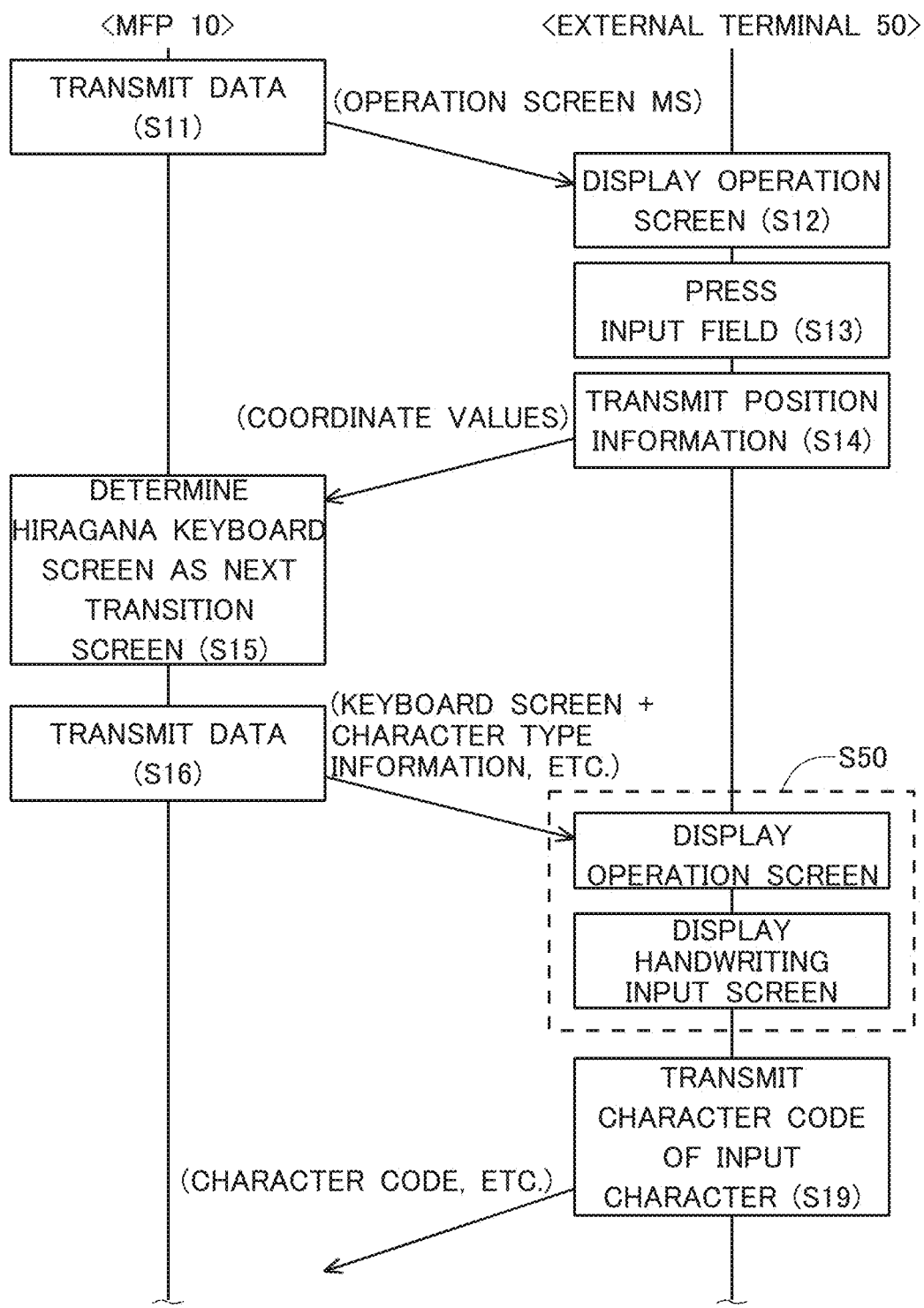
FIG. 8 illustrates operations performed by the image forming apparatus and the external terminal in the case of inputting a Japanese hiragana character.

Next is a description of operations performed in the image forming system 1 with reference to FIG. 8. FIG. 8 illustrates operations regarding input of the registration name field TN. FIG. 8 illustrates operations performed by the image forming apparatus 10 and the external terminal 50.

First, in response to an operator's operation, the image forming apparatus 10 (the transmission unit 4a) transmits image data of the operation screen MS (FIG. 4) (also referred to as "operation screen data") to the external terminal 50 (step S11).

The external terminal 50 (the display control unit 63) displays the operation screen MS on the touch panel 75 on the basis of the received operation screen data (step S12).

Thereafter, an operation of input to the operation screen MS displayed on the touch panel 75 is performed (step S13). Here, it is assumed that the registration name field TN in the operation screen MS is pressed by the operator. In response to this pressing operation, the external terminal 50 (e.g., the communication control unit 11) transmits position information MP regarding operation input from the operator (specifically, position information regarding the coordinates of the pressed position, etc.) to the image forming apparatus 10 (step S14).

When having received the position information MP, the image forming apparatus 10 (the reception unit 4b and the screen transition control unit 14) determines, on the basis of the position information MP, that the position pressed by the operator is a position within the registration name field TN and that the operation input from the operator is a display instruction to display the hiragana keyboard screen KH, and determines to display the hiragana keyboard screen KH as the next transition screen (step S15).

To be more specific, first, the reception unit 4b receives information regarding the operation input from the operator to the operation screen MS (SE) displayed in the external terminal 50 (operation input information) (in this example, the position information MP) from the external terminal 50. Next, the screen transition control unit 14 determines, on the basis of the received operation input information, that the position pressed by the operator is a position within the registration name field TN and that the operation input from the operator is a display instruction to display the hiragana keyboard screen KH. To be specific, the screen transition control unit 14 determines, on the basis of the operation input information, whether or not the operation input is a display instruction to display a character input screen, and acquires (character type information indicating) the type of characters to be input in the character input screen. Here, the screen transition control unit 14 determines that the operation input is a display instruction to display a character input screen and acquires information indicating that the character type information regarding characters to be input in the character input screen is "hiragana".

In response to this result of processing, the image forming apparatus 10 (screen transition control unit 14) transmits data regarding the hiragana keyboard screen KH to the external terminal 50 (step S16). The data regarding the hiragana keyboard screen KH includes image data for displaying the hiragana keyboard screen KH as a new operation screen, and information (character type information) CS indicating the type (here, "hiragana") of characters to be input in the hiragana keyboard screen KH. The data regarding the hiragana keyboard screen KH also includes data regarding the input character display field DF in the hiragana keyboard screen KH (e.g., the position and size of the input character display field DF and information (initial value) regarding characters in the input character display field DF).

When having received the data regarding the hiragana keyboard screen KH from the image forming apparatus 10, the external terminal 50 (display control unit 63) performs, for example, processing for displaying the operation screen (FIG. 10) in step S50.

Specifically, first in step S51, branch processing is performed according to whether or not the operation input from the operator is a request to input characters.

If it has been determined that the operation input from the operator is not a request to input characters, the procedure proceeds to step S58, in which processing for displaying an updated image (updated screen) according to the operation input is performed. For example, if the button BN2 is pressed in step S13, an updated image (specifically, data of the image) in which the button BN2 is changed to a selected state and the button BN1 is changed to a non-selected state is transmitted from the image forming apparatus 10 to the external terminal 50 and displayed on the touch panel 75. In this way, when information indicating the provision of the instruction to select the button BN2 (specifically, updated image data that has reflected the selection instruction) is received, the handwriting input application is not activated.

On the other hand, if it has been determined that the operation input from the operator is a request to input characters, the procedure proceeds to step S52. In step S52, the external terminal 50 acquires the character type information CS transmitted from the image forming apparatus 10. Then, in step S53, it is determined, on the basis of the character type information CS, which one of "number", the "alphabet", "hiragana", and "katakana" is the type of characters to be input. If the type of characters to be input is either "hiragana" or "katakana", the procedure proceeds to step S54, and if the type of characters to be input is either "number" or the "alphabet", the procedure proceeds to step S56.

Here, it is assumed that the type of characters to be input is "hiragana" and the procedure proceeds to step S54. In step S54, the external terminal 50 (display control unit 63) displays the hiragana keyboard screen KH (see FIG. 5) on the basis of the received data. The external terminal 50 (the display control unit 63 and the IME control unit 64) further activates the handwriting input IME in response to the start of display of the hiragana keyboard screen KH and displays the input screen HS for the handwriting input IME on the hiragana keyboard screen KH in a superimposed manner (step S55). In this way, the input screen HS for the handwriting input IME is displayed on the touch panel 75 immediately after the hiragana keyboard screen KH started to be displayed.

Then, as described above, when a line representing a character (e.g., hiragana letter "U") is drawn in the handwriting input area WD of the handwriting input screen HS by a finger of the operator, the handwriting input IME performs character recognition processing on the basis of the trajectory of finger movement or the like and displays conversion candidates (input candidates) based on the result of the character recognition processing in the conversion candidate field CA (FIG. 7). When the operator has selected the desired option (e.g., a Japanese Kanji character called "UE") from the conversion candidate field CA, the selected character string is displayed in the input character display field DF.

Thereafter, in step S19 (FIG. 8), the selected character string (specifically, character codes of the respective characters) is also transmitted to the image forming apparatus 10 (step S19). By receiving information regarding the character string, the image forming apparatus 10 also acquires the content of the operation input using the handwriting input IME and recognizes the same content as that displayed in the input character display field DF of the external terminal 50 as the operator's input content. A group of character codes in the character string is preferably transmitted to the image forming apparatus 10, together with the position of each character of the character string in the input character display field DF.

The operation regarding the input of the registration name field TN is performed through the procedure described above.

Figure 9:
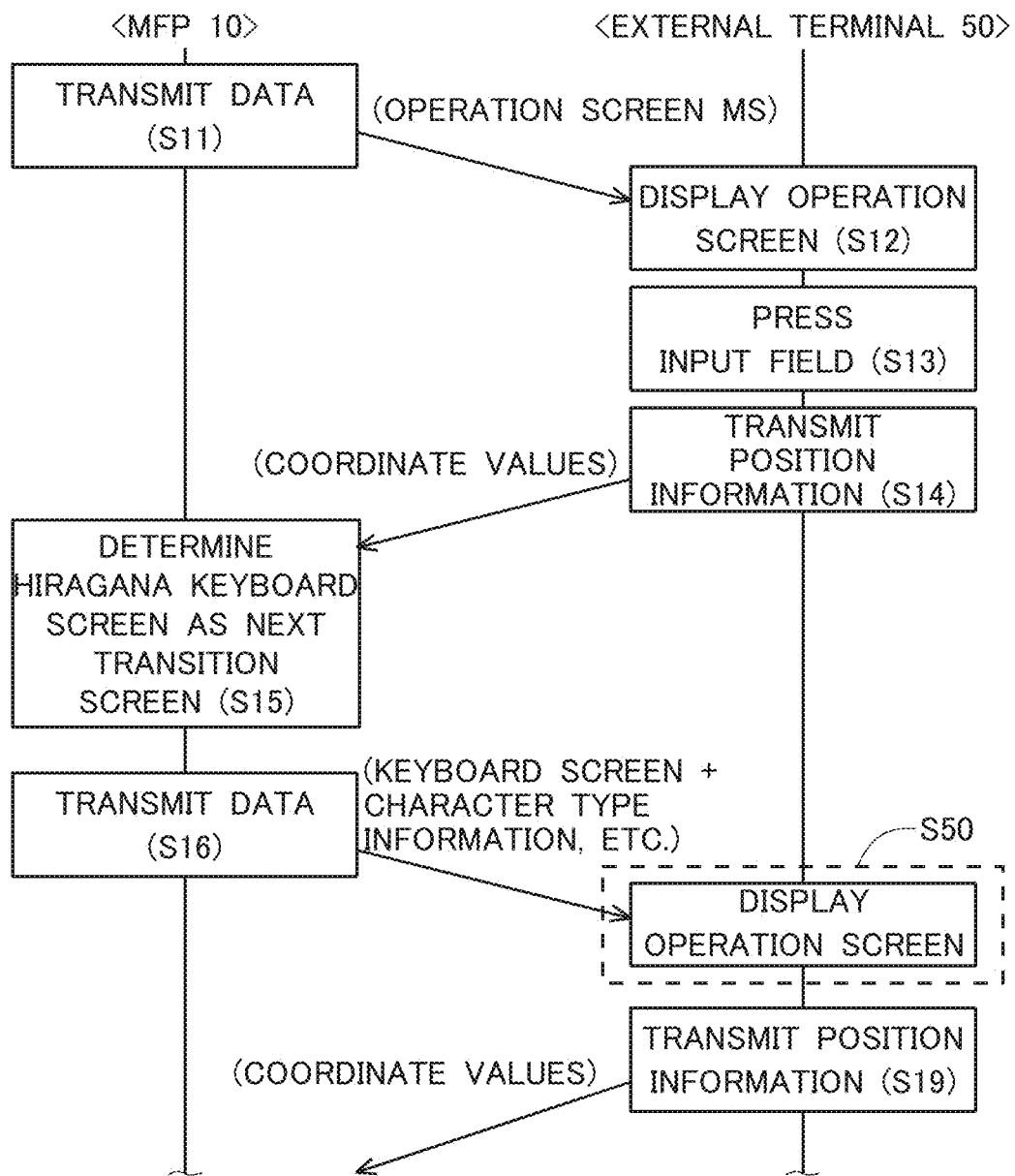
FIG. 9 illustrates operations performed by the image forming apparatus and the external terminal in the case of inputting a number.

Next, an operation regarding input of the registration number field DN in the operation screen MS, for example, will be described with reference to FIG. 9. FIG. 9 illustrates operations regarding the input of the registration number field DN.

Steps S11 to S14 in FIG. 9 perform the same processing as that in FIG. 8. It is, however, assumed that in step S13, the registration number field DN is pressed by the operator, and in step S14, position information regarding the pressed position in the registration number field DN is transmitted from the external terminal 50 to the image forming apparatus 10.

In step S15, when having received the position information MP from the external terminal 50, the image forming apparatus 10 determines on the basis of the position information MP that the position pressed by the operator is a position within the registration number field DN and operation input from the operator is a display instruction to display the numeric keyboard screen KN, and determines to display the numeric keyboard screen KN as the next transition screen. The screen transition control unit 14 determines that the operation input is a display instruction to display a character input screen, and acquires information indicating that the character type information for the character input screen is "number".

Then, in response to this result of processing, the image forming apparatus 10 (screen transition control unit 14) transmits data regarding the numeric keyboard screen KN to the external terminal 50 (step S16). The data regarding the numeric keyboard screen KN includes image data for displaying the numeric keyboard screen KN as a new operation screen, and information (character type information) CS indicating the type of characters to be input in the numeric keyboard screen KN. The data regarding the numeric keyboard screen KN also includes data regarding the input character display field DF in the numeric keyboard screen KN (e.g., the position and size of the input character display field DF and information (initial value) regarding characters in the input character display field DF).

Meanwhile, when having received the data regarding the numeric keyboard screen KN from the image forming apparatus 10, the external terminal 50 (display control unit 63) performs, for example, processing for displaying the operation screen (FIG. 10) in step S50.

Specifically, first in step S51, it is determined that the operation input from the operator is a request to input characters (specifically, numeric input), and the procedure proceeds to step S52. In step S52, the character type information CS transmitted from the image forming apparatus 10 is acquired.

Then, in step S53, which one of "number", "alphabet", "hiragana", and "katakana" is the type of characters to be input is determined on the basis of the character type information CS, and the same branch processing as described above is performed on the basis of the determination result.

Here, it is assumed that the character type is determined as "number" and the procedure proceeds to step S56. In step S56, the external terminal 50 (display control unit 63) displays the numeric keyboard screen KN (see FIG. 6) on the basis of the received data. At this time, the external terminal 50 (the display control unit 63 and the IME control unit 64) does not activate the handwriting input IME in response to the start of display of the numeric keyboard screen KN.

In such a display state, the operator is capable of performing a character input operation using the numeric keyboard screen KN.

According to the operations described above, if it is determined, on the basis of the operation input information (position information) regarding operation input from the operator to the operation screen displayed on the external terminal 50, that the operation input is a display instruction to display a character input screen, the character type information CS indicating the type of characters to be input in the operation input screen is transmitted from the image forming apparatus 10 to the external terminal 50 (step S16). Then, on condition that the character type information CS indicates a first character type ("hiragana" or "katakana"), the external terminal 50 activates the handwriting input IME installed in the external terminal 50 and displays the handwriting input screen HS on the touch panel 75 (step S50 in FIG. 8). On the other hand, if the character type information CS indicates a second character type ("number" or the "alphabet"), which is different from the first character type, the external terminal 50 does not activate the handwriting input IME and displays a character input screen (e.g., the numeric keyboard screen) for input of the second character type on the touch panel 75 (step S50 in FIG. 9).

Accordingly, high convenience using the handwriting input IME can be offered at the time of, for example, inputting "hiragana" characters. On the other hand, at the time of inputting "numbers", it is possible to input numbers through a simple operation (an operation of pressing buttons corresponding to the desired number from among the buttons corresponding to numbers 0 to 9) using the original numeric keyboard screen without using the handwriting input IME. In other words, the external terminal 50 is capable of readily using a plurality of character input methods (an input method using a keyboard screen and an input method using a handwriting input screen) as well as appropriately using such different character input methods.

Note that various types of character input methods can also be used where appropriate even in the case of displaying keyboard screens other than the numeric keyboard screen KN and the hiragana keyboard screen KH. For example, in the case of using the katakana keyboard screen KK, the handwriting input IME is activated to enable handwriting input using the handwriting input screen HS as in the case of using the hiragana keyboard screen KH. In the case of using the alphabetical keyboard screen KA (FIG. 11), the handwriting input IME is not activated as in the case of using the numeric keyboard screen KN. In this case, letters of the alphabet are input using the original keyboard screen (in the present example, the alphabetical keyboard screen KA). To be more specific, in the case of inputting an e-mail address in an operation screen having an entry field for e-mail address, the keyboard screen KA for "alphabetical" input is displayed without activating the handwriting input IME, and an input operation is performed using the keyboard screen KA for "alphabetical" input.

While the present embodiment describes the FTP communication setting screen (FIG. 4) as an example of the operation screen MS, the present invention is not limited thereto, and the idea of the present invention is applicable to various types of setting screens.

2. Second Embodiment

In the above-described first embodiment, when the hiragana keyboard screen KH is displayed on the touch panel 75, the handwriting input IME is always activated to display the handwriting input screen HS, but the present invention is not limited thereto. For example, when a predetermined condition is satisfied, the handwriting input IME may not be activated even if the hiragana keyboard screen KH is displayed on the touch panel 75 (in other words, the character type information CS is "hiragana"). One example of the predetermined condition is that an operation screen that has been displayed immediately before display of the character input screen is a specific type of screen (e.g., a narrowed search screen). Such a configuration will be described in the second embodiment.

Figure 13:
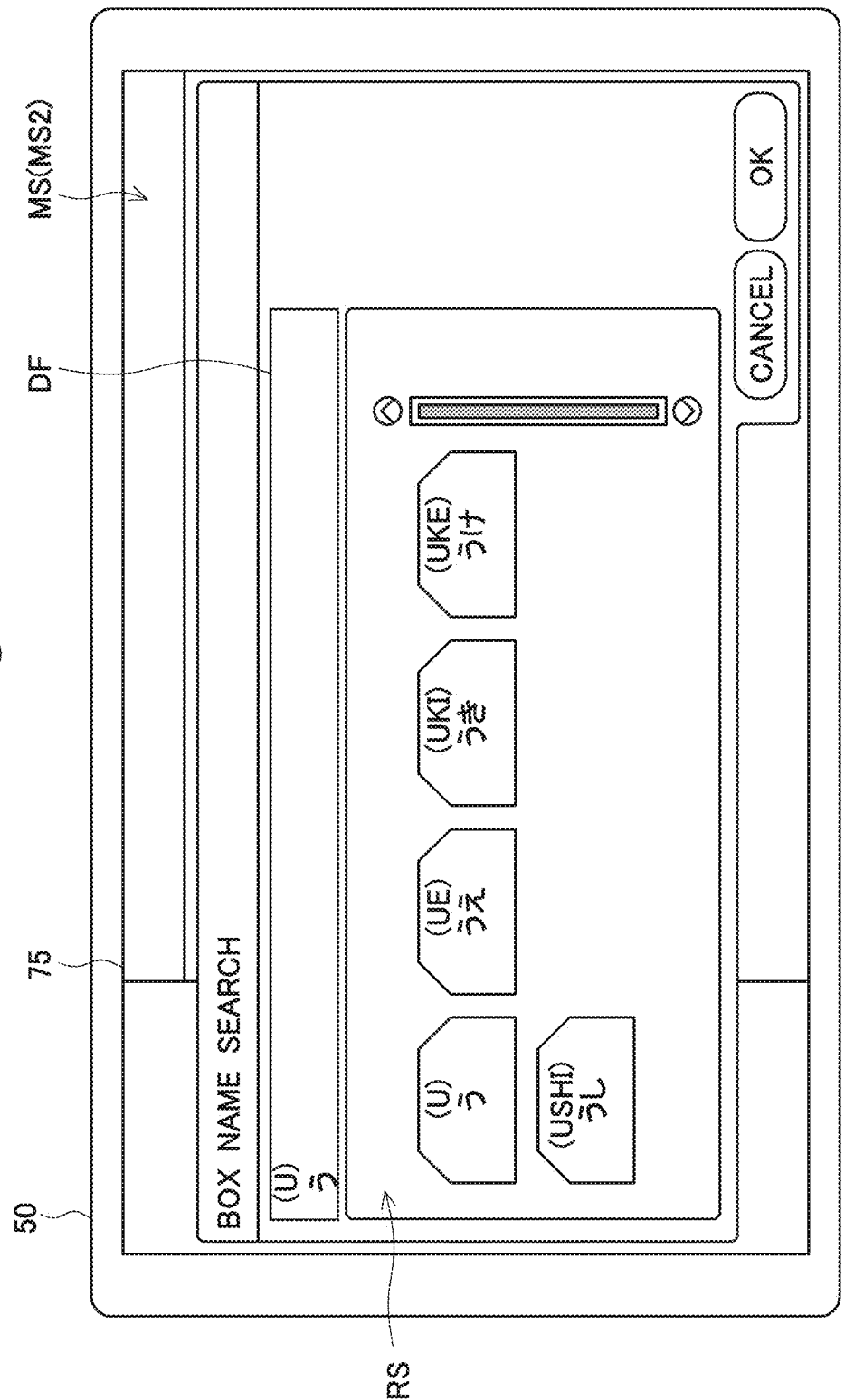
FIG. 13 illustrates an operation screen (narrowed search screen) according to a second embodiment.
Figure 14:
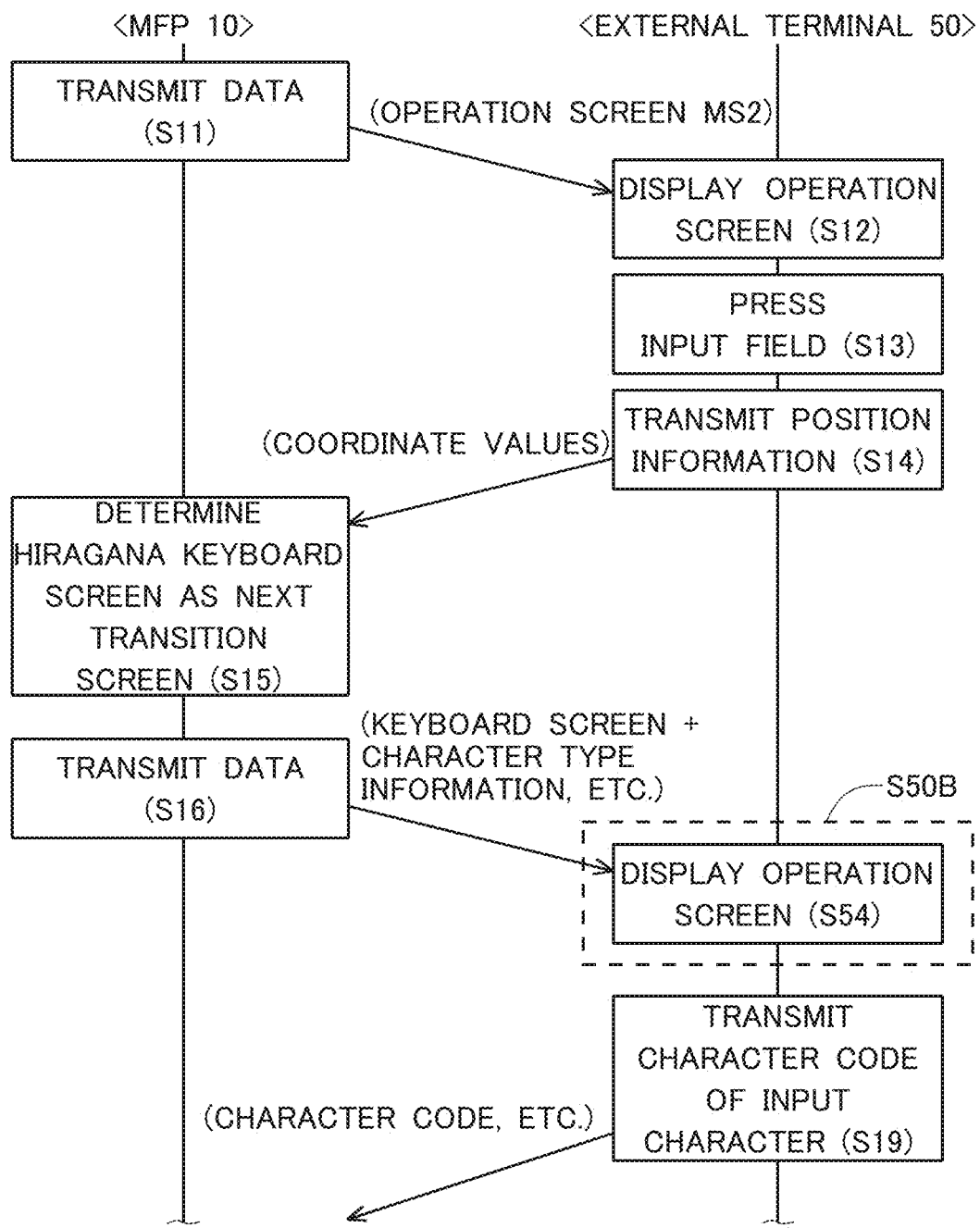
FIG. 14 illustrates operations according to the second embodiment.

FIG. 13 illustrates an operation screen MS (also referred to as "MS2") displayed in the second embodiment. FIG. 14 illustrates operations according to the second embodiment, and FIG. 15 is a flowchart showing part of the operations according to the second embodiment.

Steps S11 to S16 in FIG. 14 perform the same processing as in the first embodiment (specifically, FIG. 8). It is, however, noted that in the second embodiment, the operation screen MS2 as shown in FIG. 13 is displayed on the touch panel 75 in step S12. The operation screen MS2 is a search screen (narrowed search screen) through which a box is searched for based on the box name. Boxes having box names starting from the character that has been input in the input character display field DF are extracted (searched for) and displayed in a search result display field RS. For example, when the Japanese hiragana character "U" is input in the input character display field DF, a plurality of boxes having box names starting from that character "U" (e.g., "U", "UE", "UKI", "UKE") are extracted and displayed in the search result display field RS. The number of characters to be input in such a narrowed search screen MS2 is generally small, ranging from one to about several characters.

Figure 15:
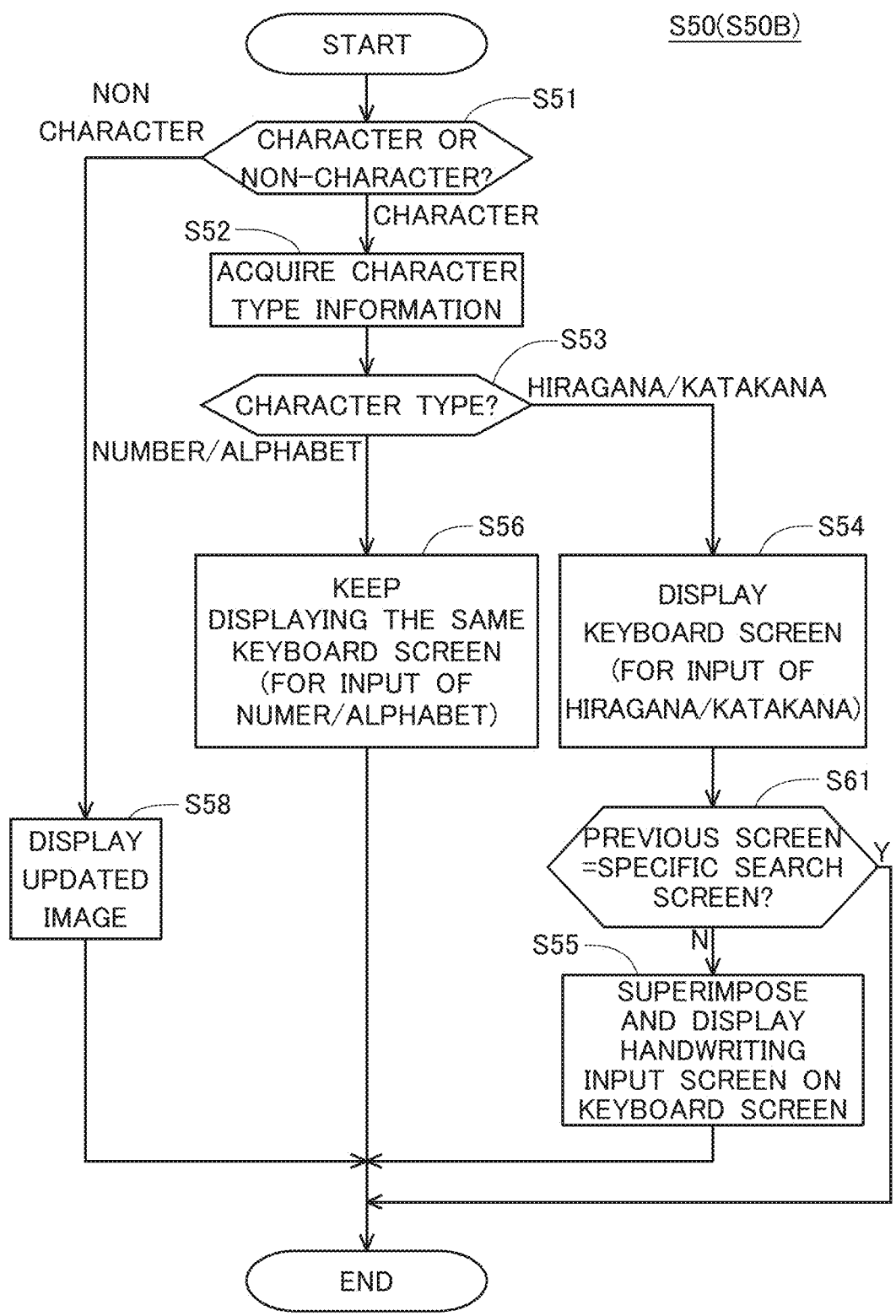
FIG. 15 is a flowchart showing part of operations performed by an external terminal according to the second embodiment.

Meanwhile, the external terminal 50 (display control unit 63) performs, for example, processing for displaying an operation screen in the next step S50 (550B) (see FIG. 15).

Specifically, first, steps S51 to S54 (FIG. 15) are performed in the same manner as in the first embodiment. In particular, in step S54, the external terminal 50 (display control unit 63) displays the hiragana keyboard screen KH (see FIG. 5) on the basis of data transmitted from the image forming apparatus 10.

Then, in step S61 following step S54, it is determined whether or not the screen (next previous display screen) that has been displayed immediately before display of the currently displayed hiragana keyboard screen KH is a specific type of screen. Specifically, it is determined whether or not the operation screen MS2 is a narrowed search screen (a screen for narrow search for a file and/or a folder that include(s) a specific character).

If it has been determined that the next previous display screen (here, the operation screen MS2) is a narrowed search screen, the processing of step S50 ends and the state in which the hiragana keyboard screen KH is being displayed is maintained. On the other hand, if it has been determined that the next previous display screen is not a narrowed search screen, the procedure proceeds to step S55. In step S55, as described above, the handwriting input IME is activated and the input screen HS for the handwriting input IME is displayed on the hiragana keyboard screen KH in a superimposed manner.

Here, it is assumed that the next previous display screen (operation screen MS2) is determined as a narrowed search screen, and the state in which the hiragana keyboard screen KH is being displayed is maintained (step S54). In other words, the handwriting input IME is not activated.

As described above, in the second embodiment, when the next previous display screen MS of the character input screen is a narrowed search screen, the handwriting input IME is not activated even if the character type information CS indicates the first character type. With this configuration, in the case where one character or so (or several characters or so) is to be input in the operation screen (narrowed search screen) MS2, the handwriting input IME is not used and an input operation is performed using the character input screen (e.g., the hiragana keyboard screen KH) for input of the first character type. In the case of inputting one character or so (or several characters or so), it is more convenient to use the hiragana keyboard screen for input rather than using the handwriting input IME, and it is possible to make effective use of the hiragana keyboard screen KH.

3. Third Embodiment

While the above-described first embodiment takes an example of the configuration in which the external terminal 50 plays an active role in determining on the basis of the character type information CS whether or not to activate the handwriting input IME, the present invention is not limited thereto, and the image forming apparatus 10 may play an active role in determining whether or not to activate the handwriting input IME. Such a configuration will be described in the third embodiment.

Figure 17:
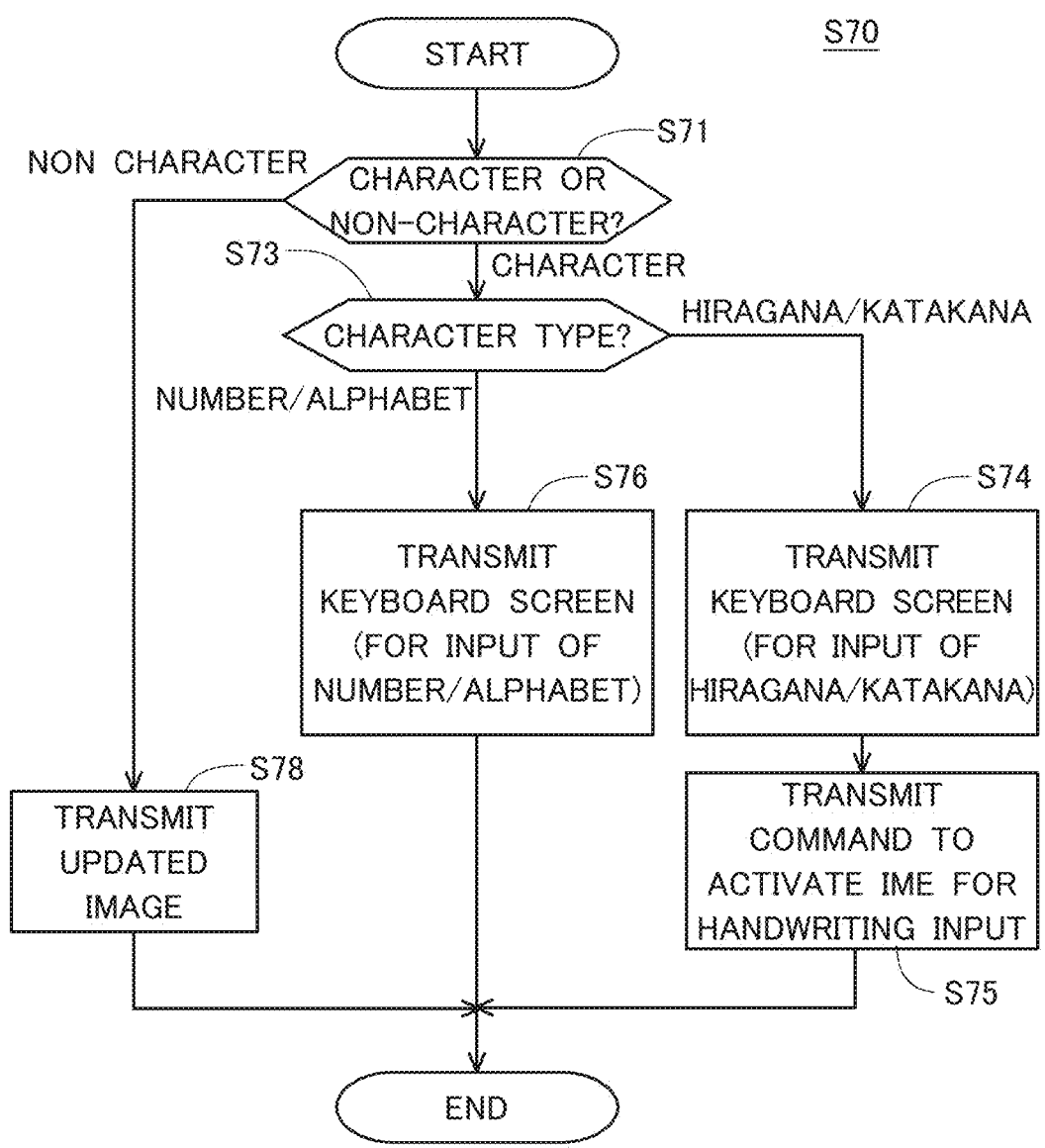
FIG. 17 is a flowchart showing part of operations performed by an image forming apparatus according to the third embodiment.

Specifically, processing similar to that of step S50 (step S70) is performed on the image forming apparatus 10 side (FIG. 17). Then, if it has been determined to activate the handwriting input IME, the image forming apparatus 10 transmits an activation command DS to the external terminal 50 (step S75). On the other hand, if it has been determined to not activate the handwriting input IME, the image forming apparatus 10 does not transmit the activation command DS to the external terminal 50.

Figure 16:
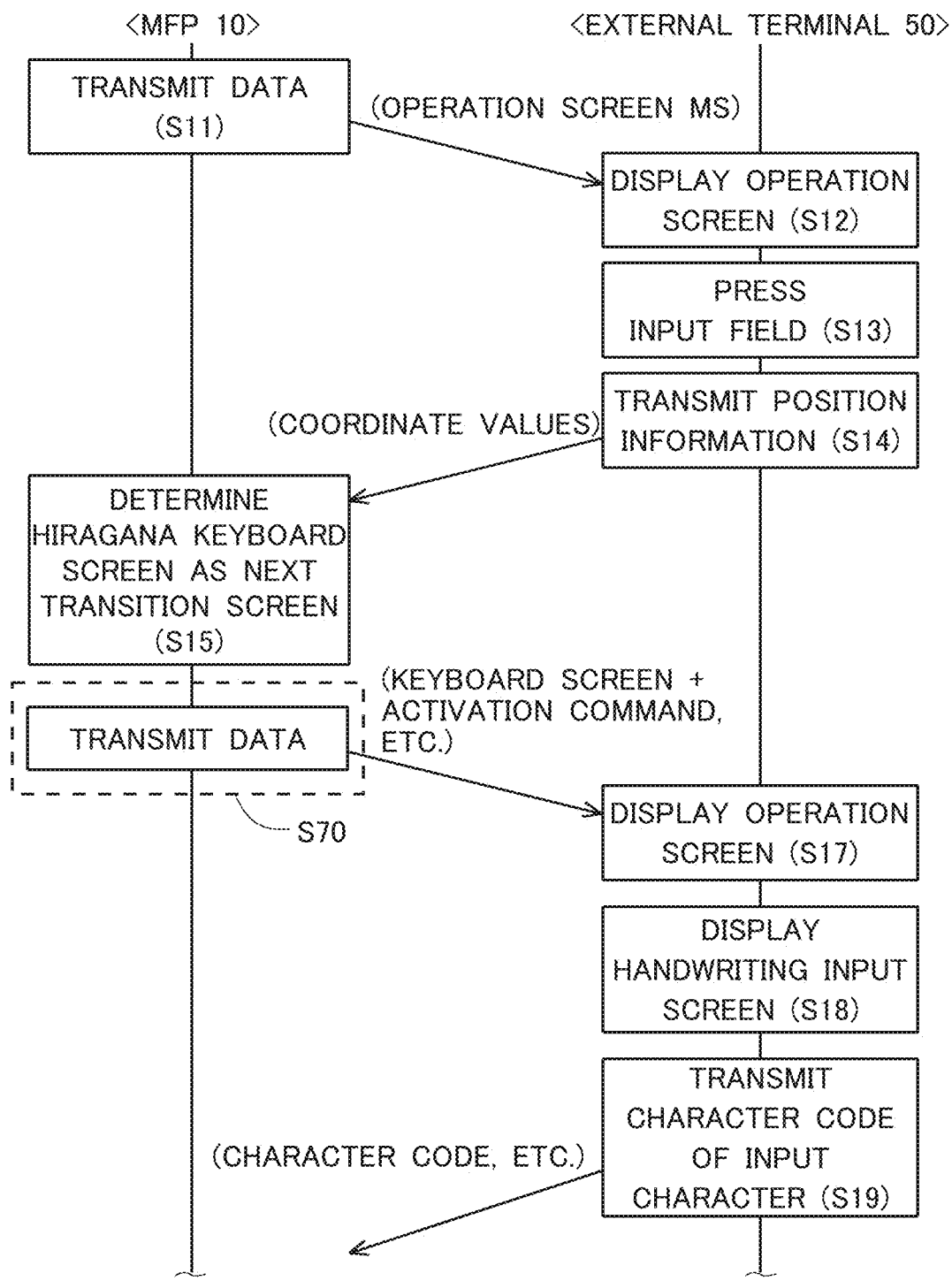
FIG. 16 illustrates operations according to a third embodiment in the case of inputting a Japanese hiragana character.

FIG. 16 illustrates operations regarding input of the registration name field TN in the operation screen MS according to the third embodiment.

Steps S11 to S14 in FIG. 16 are the same as those in the first embodiment.

In step S15, as in the first embodiment, the reception unit 4b receives information (operation input information) (in this example, the position information MP) regarding operation input from the operator to the operation screen MS (SE) displayed on the external terminal 50, from the external terminal 50. The screen transition control unit 14 determines, on the basis of the received operation input information, that the position pressed by the operator is a position within the registration name field TN and that the operation input from the operator is a display instruction to display the hiragana keyboard screen KH. The screen transition control unit 14 not only determines that the operation input is a display instruction to display a character input screen, but also acquires information indicating that the character type information CS for the character input screen is "hiragana". The screen transition control unit 14 is also referred to as an acquisition unit configured to acquire the character type information CS.

Next, the processing of step S70, instead of step S16, is performed by the image forming apparatus 10 (e.g., the screen transition control unit 14 and the transmission unit 4a) (see FIG. 17).

Figure 10:
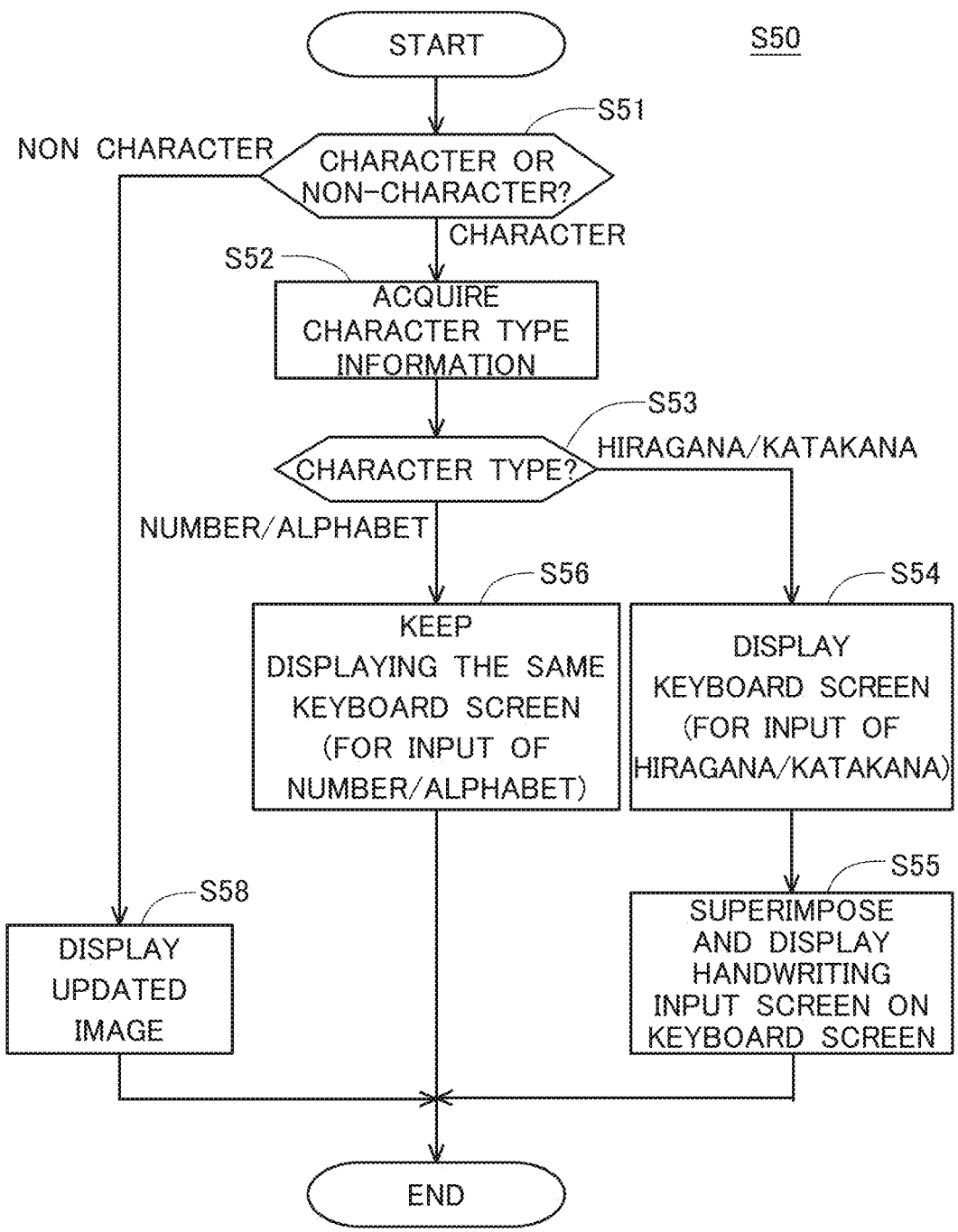
FIG. 10 is a flowchart showing part of operations performed by the external terminal.

Steps S71 and S73 respectively perform the same processing as steps S51 and S53 (FIG. 10). Specifically, first in step S71, branch processing is performed according to whether or not the operation input from the operator is a request to input characters. If it has been determined that the operation input from the operator is not a request to input characters, the procedure proceeds to step S78, and processing for transmitting an updated screen according to the operation input is performed. On the other hand, if it has been determined that the operation input from the operator is a request to input characters, the procedure proceeds to step S73. In step S73, branch processing is performed according to which one of "number", "alphabet", "hiragana", and "katakana" is the type of characters to be input. In other words, the branch processing is performed based on the character type information CS. If the type of characters to be input is either "hiragana" or "katakana", the procedure proceeds to step S74, and if the type of characters to be input is either "number" or "alphabet", the procedure proceeds to step S76.

Here, it is assumed that the type of characters to be input is determined as "hiragana", and the procedure proceeds to step S74. In step S74, the image forming apparatus 10 (transmission unit 4a) transmits data regarding the hiragana keyboard screen KH to the external terminal 50. In the next step S75, the image forming apparatus 10 also transmits data regarding the activation command DS to activate the handwriting input IME to the external terminal 50. The data regarding the activation command DS includes, for example, data (activation command data) that indicates an activation command itself to activate the handwriting input IME installed in the external terminal 50.

Meanwhile, the external terminal 50 (display control unit 63) displays the hiragana keyboard screen KH (see FIG. 5) on the touch panel 75 on the basis of the received data (step S17). Moreover, in response to the activation command DS from the image forming apparatus 10, the external terminal 50 (the display control unit 63 and the IME control unit 64) activates the handwriting input IME and displays the input screen HS for the handwriting input IME on the hiragana keyboard screen KH in a superimposed manner (step S18). In this way, the input screen HS for the handwriting input IME is displayed on the touch panel 75 immediately after the hiragana keyboard screen KH started to be displayed.

Hereinafter, the operations similar to those in the first embodiment are performed for the input of the registration name field TN.

Figure 18:
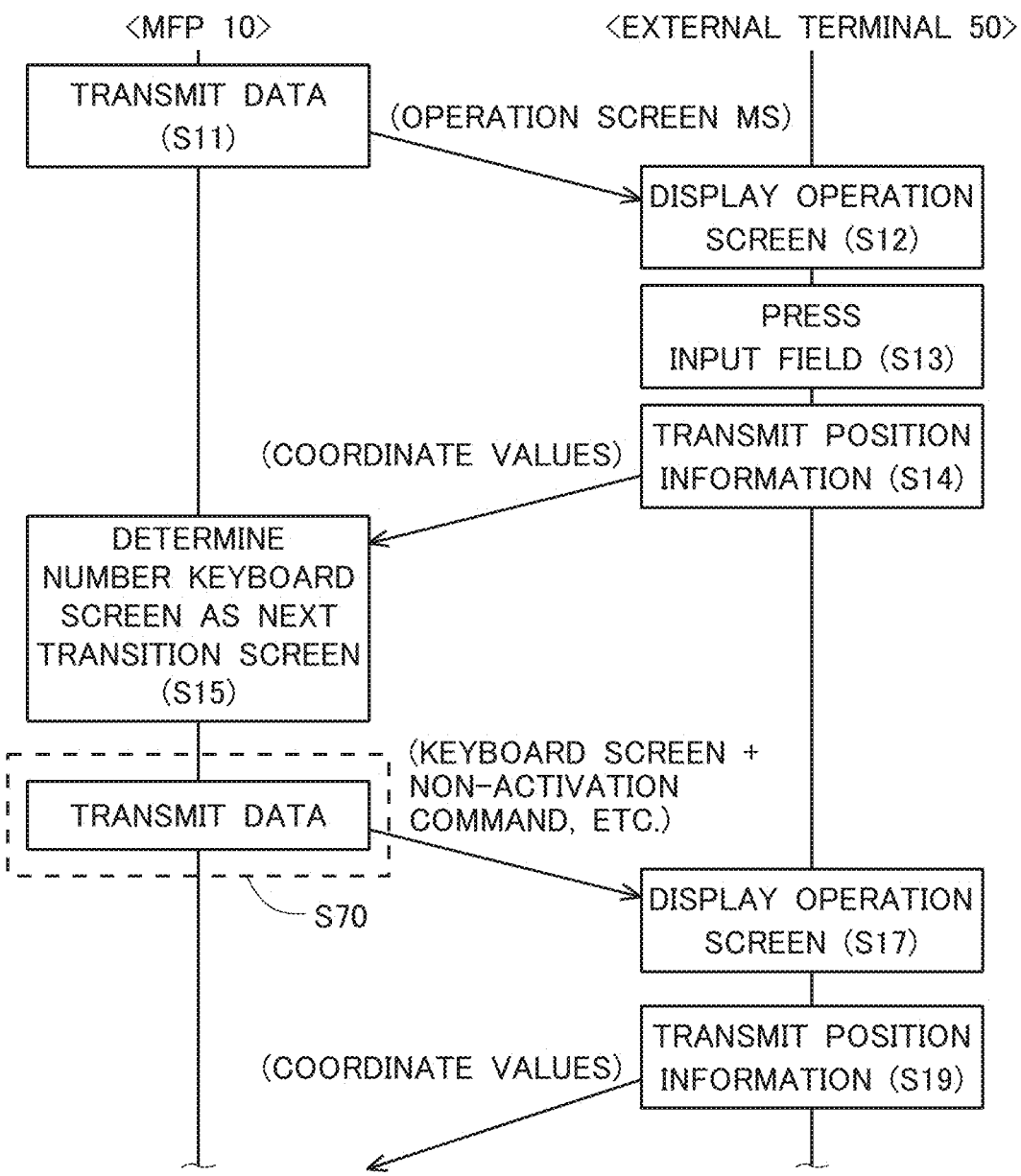
FIG. 18 illustrates operations according to the third embodiment in the case of inputting a number.

Next, an operation of input of the registration number field DN in the operation screen MS will be described with reference to FIG. 18. FIG. 18 illustrates operations of input of the registration number field DN in the operation screen MS according to the third embodiment.

Steps S11 to S14 in FIG. 18 are the same as to those in the first embodiment. It is, however, assumed that in step S13, the registration number field DN is pressed, and in step S14, position information regarding the pressed position in the registration number field DN is transmitted from the external terminal 50 to the image forming apparatus 10.

In step S15, when having received the position information MP from the external terminal 50, the image forming apparatus 10 determines on the basis of the position information MP that the position pressed by the operator is a position within the registration number field DN and that operation input from the operator is a display instruction to display the numeric keyboard screen KN, and determines to display the numeric keyboard screen KN as the next transition screen. The screen transition control unit 14 not only determines that the operation input is a display instruction to display a character input screen, but also acquires information indicating that the character type information for the operation input screen is "number".

Next, the processing of step S70 is performed, instead of step S16 (see FIG. 17).

First, the processing of steps S71 and S73 described above is performed. Here, it is assumed that the type of characters to be input is determined as "number" and the procedure proceeds to step S76. In step S76, data regarding the numeric keyboard screen KN is transmitted from the image forming apparatus 10 (transmission unit 4a) to the external terminal 50. The activation command DS to activate the handwriting input IME, on the other hand, is not transmitted to the external terminal 50.

The external terminal 50 (display control unit 63) displays the numeric keyboard screen KN (see FIG. 6) on the touch panel 75 on the basis of the received data (step S17). Since the activation command DS is not transmitted from the image forming apparatus 10 to the external terminal 50, the external terminal 50 (the display control unit 63 and the IME control unit 64) does not activate the handwriting input IME. In such a display state, the operator of the external terminal 50 is capable of performing a character input operation (number input operation) using the numeric keyboard screen KN. Hereinafter, the operations similar to those in the first embodiment are performed for the input of the registration number field DN.

As described above with FIG. 16, when it has been determined that the operation input is a display instruction to display a character input screen, the activation command DS to activate the handwriting input application installed in the external terminal 50 is transmitted to the external terminal 50, on condition that the type of characters to be input is the first character type ("hiragana" or "katakana"). Then, in response to the activation command DS, the external terminal 50 activates the handwriting input application so that the handwriting input screen HS is displayed on the touch panel 75.

On the other hand, if the type of characters to be input is the second character type (number or the alphabet) as shown in FIG. 18, the activation command DS is not transmitted to the external terminal 50. As a result, the external terminal 50 does not activate the handwriting input application and does not display the handwriting input screen HS on the touch panel 75. In this case, the external terminal 50 receives an input operation using the original keyboard screen (e.g., numeric keyboard screen).

Accordingly, as in the first embodiment, the external terminal 50 is capable of readily using a plurality of character input methods (an input method using a keyboard screen and an input method using a handwriting input screen) as well as appropriately using different character input methods.

4. Variations

While the above has been a description of embodiments of the present invention, the present invention is not limited to the examples described above.

For example, while the embodiments described above take an example of the case where a landscape numeric keyboard screen or the like is used as a keyboard for input of the first character type, the present invention is not limited thereto. Specifically, a numeric keyboard such as a numeric keypad or the like may be used as a keyboard for input of the first character type.

While the above-described first and second embodiments take an example of a configuration in which the explicit character type information CS is transmitted from the image forming apparatus 10 to the external terminal 50, the present invention is not limited thereto. For example, information regarding the type of keyboard screens may be transmitted as the character type information CS from the image forming apparatus 10 to the external terminal 50. To be more specific, for example, information indicating the numeric keyboard screen (e.g., a screen ID of the numeric keyboard screen) may be used as character type information CS that indicates that the type of characters to be input in the character input screen is "number".

While the embodiments takes an example of the case where the touch coordinate information (the coordinates of the touched position) or the like is used as information (operation input information) regarding operation input to the operation screen MS displayed on the touch panel 75, the present invention is not limited thereto. For example, a configuration is possible in which the external terminal 50 determines an option selected on the touch panel 75, and information regarding the selected option (selected content) is transmitted as operation input information from the external terminal 50 to the image forming apparatus 10.

While the above-described embodiments take an example of a configuration in which the screens such as the operation screens MS, MS2 and the keyboard screens KH, KK, KN, KA are transmitted in sequence from the image forming apparatus 10 to the external terminal 50, the present invention is not limited thereto. For example, the screens such as the operation screens MS, MS2 and the keyboard screens KH, KK, KN, KA may be stored in advance in the external terminal 50. Then, in response to operation input from the operator, the screen ID of a screen to be displayed according to information regarding the operation input (operation input information) may be transmitted to the external terminal 50, and an image corresponding to that screen ID (the image stored in advance in the external terminal 50) may be displayed on the touch panel 75.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A remote control apparatus for remotely controlling an image forming apparatus, comprising:
    a display unit configured to display an operation screen for remotely controlling the image forming apparatus; and
    a hardware processor configured to:
        receive character type information from the image forming apparatus when an operator inputs an instruction to display a character screen input to the operation screen, the character type information indicating a type of characters to be input in the character input screen, the type of characters including a first character type corresponding to a handwriting input method of a handwriting input application and a second character type different from the first character type;
        in response to receiving the character type information from the image forming apparatus that indicates the first character type, automatically activating the handwriting input application installed in the remote control apparatus and displaying a handwriting input screen on the display unit, the handwriting input screen being an input screen for the handwriting input application,
        in response to receiving the character type information from the image forming apparatus that indicates the second character type, displaying a character input screen included on the operation screen for input of the second character type on the display unit without activating the handwriting input application; and
        display a character input screen for input of the first character type on the display unit without activating the handwriting input application even if the character type information indicates the first character type when a screen that has been displayed before display of the character input screen is a narrowed search screen.

2. The remote control apparatus according to claim 1, wherein the second character type includes at least one of numbers and English alphabet.

3. The remote control apparatus according to claim 1, wherein the first character type includes at least one of Japanese hiragana and katakana.

4. The remote control apparatus according to claim 1, wherein the hardware processor is configured to, when the operation input is a selection instruction to select an option in the operation screen, receive information indicating provision of the selection instruction from the image forming apparatus, and
the hardware processor is configured to not activate the handwriting input application when receiving the information indicating provision of the selection instruction.

5. An image forming system comprising:
an image forming apparatus; and
the remote control apparatus according to claim 1 for remotely controlling the image forming apparatus,
the image forming apparatus including:
a reception unit configured to receive operation input information from the remote control apparatus, the operation input information being information regarding operation input from an operator to an operation screen displayed on the remote control apparatus; and
a transmission unit configured to, when it is determined on the basis of the operation input information that the operation input is a display instruction to display a character input screen, transmit character type information to the remote control apparatus, the character type information being information that indicates a type of characters to be input in the operation input screen.

6. The image forming system according to claim 5, wherein the second character type includes at least one of numbers and English alphabet.

7. The image forming system according to claim 5, wherein the first character type includes at least one of Japanese hiragana and katakana.

8. The image forming system according to claim 5, wherein
the transmission unit is configured to, when it is determined on the basis of the operation input information that the operation input is a selection instruction to select an option in the operation screen, transmit information indicating provision of the selection instruction to the remote control apparatus, and
the hardware processor is configured to not activate the handwriting input application when receiving the information indicating provision of the selection instruction.

9. The remote control apparatus according to claim 1, wherein the handwriting input screen is an input screen for a handwriting input method using a handwritten character recognition technique which receives operation input of a handwritten character from an operating user and recognizes the input handwritten character.

10. The remote control apparatus according to claim 1, wherein the character input screen for input of the second character type is an input screen for inputting characters using a key corresponding to any character, and a character input screen for input of the first character type is an input screen for inputting characters not using the key.

11. The remote control apparatus according to claim 1, wherein the handwriting input screen is displayed so as to overlap on the character input screen of the operation screen.

12. The remote control apparatus according to claim 1, wherein the operation screen is an image sent from the image forming apparatus, the operation screen being displayed on the image forming apparatus.

13. A non-transitory computer-readable recording medium that records a program for causing a computer built into a remote control apparatus for remotely controlling an image forming apparatus to execute the steps of:
a) displaying an operation screen for remotely controlling the image forming apparatus on a display unit of the remote control apparatus;
b) receiving character type information from the image forming apparatus when an operator inputs an instruction to display a character screen input to the operation screen, the character type information indicating a type of characters to be input in the character input screen, the type of characters including a first character type corresponding to a handwriting input method of a handwriting input application and a second character type different from the first character type;
c) in response to receiving the character type information from the image forming apparatus that indicates the first character type, automatically activating the handwriting input application installed in the remote control apparatus and displaying a handwriting input screen on the display unit, the handwriting input screen being an input screen for the handwriting input application;
d) in response to receiving the character type information from the image forming apparatus that indicates the second character type, displaying a character input screen included on the operation screen for input of the second character type on the display unit without activating the handwriting input application; and
e) when a screen that has been displayed before the character input screen is to be displayed in accordance with the display instruction is a narrowed search screen, displaying a character input screen for input of the first character type on the display unit without activating the handwriting input application even if the character type information is received from the image forming apparatus in step b) and indicates the first character type.

14. The recording medium according to claim 13, wherein the second character type includes at least one of numbers and English alphabet.

15. The recording medium according to claim 13, wherein the first character type includes at least one of Japanese hiragana and katakana.

16. The recording medium according to claim 13, wherein the program further causes the computer to execute the step of:
f) when the operation input from the operator to the operation screen is a selection instruction to select an option in the operation screen, receiving information indicating provision of the selection instruction from the image forming apparatus, and
when the information indicating provision of the selection instruction is received in the step f), the handwriting input application is not activated.

17. The recording medium according to claim 13, wherein the handwriting input screen is an input screen for a handwriting input method using a handwritten character recognition technique which receives operation input of a handwritten character from an operating user and recognizes the input handwritten character.

18. The recording medium according to claim 13, wherein the character input screen for input of the second character type is an input screen for inputting characters using a key corresponding to any character, and a character input screen for input of the first character type is an input screen for inputting characters not using the key.

19. The recording medium according to claim 13, wherein the handwriting input screen is displayed so as to overlap on the character input screen of the operation screen.

20. The recording medium according to claim 13, wherein the operation screen is an image sent from the image forming apparatus, the operation screen being displayed on the image forming apparatus.

21. An image forming apparatus capable of remotely controlling a remote control apparatus, comprising:
a hardware processor configured to:
receive operation input information from the remote control apparatus, the operation input information being information regarding operation input from an operator to an operation screen displayed in the remote control apparatus;
determine, on the basis of the operation input information, whether or not the operation input is a display instruction to display a character input screen and to acquire character type information that indicates a type of characters to be input in the character input screen, the type of characters including a first character type corresponding to a handwriting input method of a handwriting input application and a second character type different from the first character type;
when it is determined that the operation input is a display instruction to display the character input screen, transmit an activation command to automatically activate the handwriting input application installed in the remote control apparatus to the remote control apparatus, in response to receiving character type information that indicates the first character type, and
not transmit the activation command so that the remote control apparatus continues to display a character input screen included in the operation screen in response to receiving character type information that indicates the second character type;
wherein the handwriting input application is not activated even if the character type information indicates the first character type when a screen displayed on the remote control apparatus before display of the character input screen is a narrowed search screen.

22. An image forming system comprising:
an image forming apparatus according to claim 21; and
the remote control apparatus for remotely controlling the image forming apparatus,
the remote control apparatus including:
a display unit configured to display the operation screen;
a display control unit configured to, when the activation command is received from the image forming apparatus, activate the handwriting input application and display a handwriting input screen that is an input screen for the handwriting input application, on the display unit,
wherein the display control unit is configured to, when the activation command is not received from the image forming apparatus, display a character input screen for input of characters of the second character type on the display unit without activating the handwriting input application.

23. The image forming apparatus according to claim 21, wherein a handwriting input screen displayed on the remote control apparatus when the handwriting input application is activated is an input screen for a handwriting input method using a handwritten character recognition technique which receives operation input of a handwritten character from an operating user and recognizes the input handwritten character.

24. The image forming apparatus according to claim 21, wherein a character input screen for input of the second character type is an input screen for inputting characters using a key corresponding to any character, and a character input screen for input of the first character type is an input screen for inputting characters not using the key.

25. The image forming apparatus according to claim 21, wherein a handwriting input screen is displayed so as to overlap on the character input screen of the operation screen.

26. The image forming apparatus according to claim 21, wherein the operation screen is an image sent from the image forming apparatus, the operation screen being displayed on the image forming apparatus.

27. A non-transitory computer-readable recording medium that records a program for causing a computer built into an image forming apparatus capable of being remotely controlled by a remote control apparatus to execute the steps of:
a) receiving operation input information from the remote control apparatus, the operation input information being information regarding operation input from an operator to an operation screen displayed on the remote control apparatus, and determining on the basis of the operation input information whether or not the operation input is a display instruction to display a character screen;
b) acquiring character type information that indicates a type of characters to be input in the character input screen, the type of characters including a first character type corresponding to a handwriting input method of a handwriting input application and a second character type different from the first character type; and
c) when it is determined that the operation input is the display instruction to display a character input screen, transmitting an activation command to automatically activate the handwriting application installed in the remote control apparatus in response to receiving character type information that indicates the first character type, and not transmitting the activation command to the remote control apparatus, so that the remote control apparatus continues to display a character input screen included in the operation screen, in response to receiving character type information that indicates the second character type,
wherein the handwriting input application is not activated even if the character type information indicates the first character type when a screen displayed on the remote control apparatus before display of the character input screen is a narrowed search screen.

28. The non-transitory computer-readable recording medium according to claim 27, wherein a handwriting input screen displayed on the remote control apparatus when the handwriting input application is activated is an input screen for a handwriting input method using a handwritten character recognition technique which receives operation input of a handwritten character from an operating user and recognizes the input handwritten character.

29. The non-transitory computer-readable recording medium according to claim 27, wherein a character input screen for input of the second character type is an input screen for inputting characters using a key corresponding to any character, and a character input screen for input of the first character type is an input screen for inputting characters not using the key.

30. The non-transitory computer-readable recording medium according to claim 27, wherein a handwriting input screen is displayed so as to overlap on the character input screen of the operation screen.

31. The non-transitory computer-readable recording medium according to claim 27, wherein the operation screen is an image sent from the image forming apparatus, the operation screen being displayed on the image forming apparatus.

* * * * *